US011317395B2

(12) United States Patent
Li et al.

(10) Patent No.: US 11,317,395 B2
(45) Date of Patent: Apr. 26, 2022

(54) GRANT-FREE RESOURCE CONFIGURATION METHOD AND APPARATUS

(71) Applicant: HUAWEI TECHNOLOGIES CO., LTD., Guangdong (CN)

(72) Inventors: You Li, Shenzhen (CN); Yalin Liu, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 75 days.

(21) Appl. No.: 16/784,786

(22) Filed: Feb. 7, 2020

(65) Prior Publication Data

US 2020/0178228 A1 Jun. 4, 2020

Related U.S. Application Data

(63) Continuation of application No. PCT/CN2018/099048, filed on Aug. 6, 2018.

(30) Foreign Application Priority Data

Aug. 8, 2017 (CN) .......................... 201710672256.0

(51) Int. Cl.
*H04W 72/04* (2009.01)
*H04W 68/02* (2009.01)
(Continued)

(52) U.S. Cl.
CPC .......... *H04W 72/042* (2013.01); *H04W 68/02* (2013.01)

(58) Field of Classification Search
CPC ... H04W 72/042; H04W 68/02; H04W 68/00; H04W 74/006; H04W 72/0446; H04L 5/00; H04L 5/0053
(Continued)

(56) References Cited

U.S. PATENT DOCUMENTS

2013/0182626 A1* 7/2013 Kuo ...................... H04W 52/02
370/311
2015/0043455 A1* 2/2015 Miklos ................... H04W 76/11
370/329
(Continued)

FOREIGN PATENT DOCUMENTS

CN 103378939 A 10/2013
CN 106160968 A 11/2016
WO 2017098442 A1 6/2017

OTHER PUBLICATIONS

ZTE: "Consideration on grant-free transmission",3GPP Draft; R2-1704699,May 14, 2017 (May 14, 2017), XP051275244.total 5 pages.
(Continued)

*Primary Examiner* — Inder P Mehra
(74) *Attorney, Agent, or Firm* — Womble Bond Dickinson (US) LLP

(57) ABSTRACT

A grant-free resource configuration method and an apparatus are provided. The method includes: listening to, by a terminal device, a physical downlink control channel on a paging occasion by using a grant-free resource configuration identifier; and obtaining, by the terminal device on the physical downlink control channel or a physical downlink shared channel indicated by the physical downlink control channel, grant-free resource configuration information sent by a network device. In this grant-free resource configuration solution, the terminal device listens to a physical downlink control channel on a same paging occasion by using different identifiers, and obtains grant-free resource configuration information. A configuration occasion is preset, to ensure that the grant-free resource configuration information can be effectively received by the terminal device. In addition, the grant-free resource configuration identifier is used, to facili-
(Continued)

tate grant-free resource configuration for the terminal device.

19 Claims, 15 Drawing Sheets

(51) Int. Cl.
*H04W 68/04* (2009.01)
*H04W 74/00* (2009.01)
*H04L 5/00* (2006.01)

(58) Field of Classification Search
USPC .......................................................... 370/329
See application file for complete search history.

(56) References Cited

U.S. PATENT DOCUMENTS

| | | | |
|---|---|---|---|
| 2015/0103768 A1 | 4/2015 | Chen et al. | |
| 2016/0007170 A1 | 1/2016 | Vaidya et al. | |
| 2016/0295613 A1* | 10/2016 | Wager | H04W 72/042 |
| 2016/0353453 A1* | 12/2016 | Au | H04W 52/0216 |
| 2020/0092805 A1* | 3/2020 | Zhang | H04W 76/28 |
| 2020/0146032 A1* | 5/2020 | Bae | H04L 5/0051 |
| 2020/0314879 A1* | 10/2020 | Tang | H04W 36/00837 |

OTHER PUBLICATIONS

Huawei, HiSilicon: "DL data transmission in RRC_Inactive", 3GPP TSG-RAN WG2 #96, R2-168860, Reno, Nevada, USA, Nov. 14-18, 2016. total 3 pages.

CMCC, "Discussion on UE states in NR",3GPP TSG-RAN WG2 Meeting #95 R2-165211,G teborg, Sweden, Aug. 22-26, 2016,total 5 pages.

3GPP TS 36.304 V14.3.0 (Jun. 2017);3rd Generation Partnership Project;Technical Specification Group Radio Access Network;Evolved Universal Terrestrial Radio Access (E-UTRA); User Equipment (UE) procedures in idle mode (Release 14);total 49 pages.

Huawei et al: "Grant-free resource configuration",3GPP Draft; R2-1705118,May 14, 2017 (May 14, 2017), XP0512755949.total 4 pages.

Huawei , "LS on UL data transmission without UL grant for NR",3GPP TSG RAN WG1 Meeting #89 R1-1709745, Hangzhou, China, 15 May 19, 2017,total 1 page.

\* cited by examiner

GRANT-FREE RESOURCE CONFIGURATION METHOD AND APPARATUS

CROSS-REFERENCE TO RELATED APPLICATIONS

This application is a continuation of International Application No. PCT/CN2018/099048, filed on Aug. 6, 2018, which claims priority to Chinese Patent Application No. 201710672256.0, filed on Aug. 8, 2017. The disclosures of the aforementioned applications are hereby incorporated by reference in their entireties.

TECHNICAL FIELD

The present disclosure relates to the field of communications technologies, and in particular, to a grant-free resource configuration method and an apparatus.

BACKGROUND

In a long term evolution (LTE) communications system, a status of a terminal device mainly includes a connected state and an idle state. In a next-generation mobile communications system, another working state, namely, an inactive state, of the terminal device is introduced. After entering the inactive state, the terminal device is woken up only in the following cases to perform an operation of receiving or sending signaling or data, and does not perform an operation of signaling receiving or sending in another case.

Case 1. The terminal device needs to listen to a radio access network paging (which is also referred to as RAN-initiated paging, RAN-based paging, or RAN-initiated notification) message or a core network paging (which is also referred to as CN-initiated paging or CN-based paging) message based on a preset period.

Case 2. If a periodic radio access network-based notification area update (RNAU) is configured, the terminal device needs to be woken up according to a preset period to send area update signaling.

Case 3. When the terminal device needs to send uplink data, state transition needs to be performed by the terminal device.

A grant-free (GF) transmission resource needs to be preconfigured for grant-free transmission. Particularly, when a situation of a resource collision is intensified, more GF resources are needed for the terminal device to choose; or GF resource adjustment is performed based on a link status; or a quantity of GF resources needs to be reduced if a quantity of users is reduced. Therefore, GF resource reconfiguration is required.

In the prior art, a solution of GF resource reconfiguration is as follows: When a terminal device sends uplink data, a response from a network device is required, and the terminal device receives GF resource reconfiguration information in a window where the response is received. However, when the network device determines to reconfigure a GF resource, a terminal device that shares the GF resource does not necessarily need to send uplink data (usually, one GF resource is shared by one or more terminal devices in one GF group). Therefore, it cannot be ensured that the GF resource reconfiguration information is sent to all terminal devices that share the GF resource.

Therefore, an urgent problem of how to configure a GF resource needs to be resolved.

SUMMARY

A grant-free resource configuration method and an apparatus are provided in the present disclosure, to easily and effectively configure grant-free resource information.

According to one aspect of the present disclosure, a grant-free resource configuration method is provided, including: listening to, by a terminal device, a physical downlink control channel on a paging occasion by using a grant-free resource configuration identifier; and obtaining, by the terminal device on the physical downlink control channel or a physical downlink shared channel indicated by the physical downlink control channel, grant-free resource configuration information sent by a network device. In this implementation, the terminal device listens to, on a preset configuration occasion, a physical downlink channel that is scrambled by using the grant-free resource configuration identifier, so that the grant-free resource configuration information can be effectively received. In addition, the terminal device may conveniently obtain the grant-free resource configuration information of the terminal device by using the grant-free resource configuration identifier.

According to another aspect of the present disclosure, a grant-free resource configuration method is provided, including: listening to, by a terminal device on a paging occasion by using a grant-free resource configuration identifier, grant-free resource configuration information sent by a network device. In this implementation, on the paging occasion, the terminal device listens to a physical downlink control channel and obtains the grant-free resource configuration information. A configuration occasion is preset, to ensure that a reconfiguration message can be effectively received by the terminal device. In addition, different grant-free resource configuration identifiers are used, to ensure that only the terminal device corresponding to the reconfiguration message can process a grant-free resource.

In one embodiment, the grant-free resource configuration identifier is used to scramble a physical downlink control channel corresponding to the grant-free resource configuration information, and the grant-free resource configuration information is carried on the physical downlink control channel or a physical downlink shared channel indicated by the physical downlink control channel. In this implementation, the grant-free resource configuration identifier is used to scramble the physical downlink control channel, and the grant-free resource configuration information is carried on the physical downlink control channel or a physical downlink shared channel indicated by the physical downlink control channel.

According to still another aspect of the present disclosure, a grant-free resource configuration method is provided, including: configuring, by a network device, a physical downlink control channel and/or a physical downlink shared channel for sending grant-free resource configuration information on a paging occasion; and sending, by the network device, the grant-free resource configuration information on the physical downlink control channel or a physical downlink shared channel indicated by the physical downlink control channel, where the physical downlink control channel is scrambled by using a grant-free resource configuration identifier. In this implementation, a configuration occasion is preset, to ensure that the grant-free resource configuration information can be effectively received by a terminal device. In addition, the grant-free resource configuration identifier is used, to facilitate grant-free resource configuration for the terminal device.

According to still another aspect of the present disclosure, a grant-free resource configuration method is provided, including: sending, by a network device on a paging occasion, grant-free resource configuration information on a physical downlink control channel or a physical downlink shared channel indicated by the physical downlink control channel, where the physical downlink control channel is scrambled by using a grant-free resource configuration identifier.

With reference to the foregoing aspects, in one embodiment, a time unit of the paging occasion includes at least one of the following: a subframe, a slot, a mini-slot, an orthogonal frequency division multiplexing symbol, a millisecond, and a second.

With reference to the foregoing aspects, in another embodiment, a physical downlink control channel and/or a physical downlink shared channel for sending a paging message on the paging occasion are/is further configured, and the physical downlink control channel is further scrambled by using a paging radio network temporary identifier. In this implementation, the paging message is further sent on the paging occasion, and the terminal device may separately listen to the paging message and the grant-free resource configuration information by using different identifiers. This further avoids frequent wake-up of the terminal device, and reduces power consumption of obtaining the paging message and the grant-free resource configuration information by the terminal device.

According to still another aspect of the present disclosure, a grant-free resource configuration method is provided, including: listening to, by a terminal device by using a grant-free resource configuration identifier, a physical downlink control channel on a grant-free resource configuration occasion that has a specified offset relative to a paging occasion; and obtaining, by the terminal device on the physical downlink control channel or a physical downlink shared channel indicated by the physical downlink control channel, grant-free resource configuration information sent by a network device. In this implementation, the terminal device obtains the grant-free resource configuration information on different occasions by using different identifiers. Therefore, it is ensured that time-frequency resources are sufficient for sending control information (such as paging information and grant-free resource configuration information) on each occasion. In addition, because the physical downlink control channel is scrambled by using the grant-free resource configuration identifier, the grant-free resource configuration information can only be received by terminal devices in a grant-free group or a specific terminal device. Therefore, grant-free resource configuration is easier and more convenient.

In one embodiment, the paging occasion and the grant-free resource configuration occasion are located in a same period.

According to still another aspect of the present disclosure, a grant-free resource configuration method is provided, including: configuring, by a network device, a physical downlink control channel and/or a physical downlink shared channel for sending grant-free resource configuration information on a grant-free resource configuration occasion that has a specified offset relative to a paging occasion; and sending, by the network device, the grant-free resource configuration information on the physical downlink control channel or a physical downlink shared channel indicated by the physical downlink control channel, where the physical downlink control channel is scrambled by using a grant-free resource configuration identifier. In this implementation, the network device sends the grant-free resource configuration information on different occasions by using different identifiers. This is easy and convenient for implementation. In addition, the grant-free resource configuration information is scrambled by using the grant-free resource configuration identifier. Therefore, grant-free resource configuration can be easier and more convenient.

According to still another aspect of the present disclosure, a grant-free resource configuration method is provided, including: sending, by a network device on a grant-free resource configuration occasion that has a specified offset relative to a paging occasion, grant-free resource configuration information on a physical downlink control channel or a physical downlink shared channel indicated by the physical downlink control channel, where the physical downlink control channel is scrambled by using a grant-free resource configuration identifier.

With reference to the foregoing aspects, in one embodiment, a time unit of the paging occasion includes at least one of the following: a subframe, a slot, a mini-slot, an orthogonal frequency division multiplexing symbol, a millisecond, and a second. A time unit of the grant-free resource configuration occasion includes at least one of the following: a subframe, a slot, a mini-slot, an orthogonal frequency division multiplexing symbol, and a millisecond.

With reference to the foregoing aspects, in one embodiment, the method further includes: configuring, by the network device, the grant-free resource configuration identifier for the terminal device.

With reference to the foregoing aspects, in one embodiment, the grant-free resource configuration identifier includes at least one of the following: a grant-free radio network temporary identifier and a cell radio network temporary identifier, where the grant-free radio network temporary identifier is a grant-free resource configuration identifier used by a plurality of terminal devices in a grant-free group, and the cell radio network temporary identifier is a grant-free resource configuration identifier used by a specific terminal device. In this implementation, a same grant-free radio network temporary identifier may be used by a plurality of terminal devices in a grant-free group, and a cell radio network temporary identifier may be used for a single terminal device that does not belong to a grant-free group, so that signaling overheads of the network device can be reduced.

With reference to the foregoing aspects, in still another embodiment, if the grant-free resource configuration identifier is a cell radio network temporary identifier, the method may further include: receiving, by the terminal device, downlink control information from the network device, where the downlink control information is used to indicate valid time information of a configured grant-free resource.

With reference to the foregoing aspects, in still another embodiment, the obtaining, by the terminal device on a physical downlink shared channel indicated by the physical downlink control channel, grant-free resource configuration information sent by a network device specifically includes: receiving, by the terminal device from the network device, radio resource control signaling carried on the physical downlink shared channel or a media access control control element carried on the physical downlink shared channel, where the radio resource control signaling or the media access control control element carries the grant-free resource configuration information.

With reference to the foregoing aspects, in still another embodiment, the obtaining, by the terminal device on the physical downlink control channel, grant-free resource configuration information sent by a network device specifically includes: receiving, by the terminal device from the network device, downlink control information carried on the physical downlink control channel, where the downlink control information carries the grant-free resource configuration information.

According to still another aspect of the present disclosure, a grant-free resource configuration method is provided, including: listening to, by a terminal device by using a paging radio network temporary identifier, a physical downlink control channel on a grant-free resource configuration occasion that has a specified offset relative to a paging occasion; and obtaining, by the terminal device on the physical downlink control channel or a physical downlink shared channel indicated by the physical downlink control channel, grant-free resource configuration information sent by a network device. In this implementation, different information is distinguished based on different occasions. The terminal device listens to the PDCCH on the grant-free resource configuration occasion by using the paging radio network temporary identifier, and then obtains the grant-free resource configuration information. This is easy and convenient for implementation. A new network temporary identifier does not need to be allocated, thereby reducing signaling required for configuration of an identifier.

In one embodiment, the paging occasion and the grant-free resource configuration occasion are located in a same period.

According to still another aspect of the present disclosure, a grant-free resource configuration method is provided, including: configuring, by a network device, a physical downlink control channel and/or a physical downlink shared channel for sending grant-free resource configuration information on a grant-free resource configuration occasion that has a specified offset relative to a paging occasion; and sending, by the network device, the grant-free resource configuration information on the physical downlink control channel or a physical downlink shared channel indicated by the physical downlink control channel, where the physical downlink control channel is scrambled by using a paging radio network temporary identifier. In this implementation, different information is sent on different occasions. The network device only needs to configure, for the terminal device, an occasion for sending the grant-free resource configuration information, and the terminal device can receive the grant-free resource configuration information. This is easy for implementation.

According to still another aspect of the present disclosure, a grant-free resource configuration method is provided, including: sending, by a network device on a grant-free resource configuration occasion that has a specified offset relative to a paging occasion, grant-free resource configuration information on a physical downlink control channel or a physical downlink shared channel indicated by the physical downlink control channel, where the physical downlink control channel is scrambled by using a paging radio network temporary identifier.

With reference to the foregoing aspects, in one embodiment, a physical downlink control channel and/or a physical downlink shared channel for sending a paging message on the paging occasion are/is further configured, where the physical downlink control channel is further scrambled by using a paging identifier.

With reference to the foregoing aspects, in another embodiment, a time unit of the paging occasion includes at least one of the following: a subframe, a slot, a mini-slot, an orthogonal frequency division multiplexing symbol, a millisecond, and a second.

With reference to the foregoing aspects, in still another embodiment, a physical downlink control channel and/or a physical downlink shared channel for sending a paging message on the paging occasion are/is further configured, where the physical downlink control channel is further scrambled by using a paging identifier.

According to still another aspect of the present disclosure, a grant-free resource configuration method is provided, including: listening to, by a terminal device by using a paging radio network temporary identifier, a physical downlink control channel on a paging occasion; and obtaining, by the terminal device on the physical downlink control channel or a physical downlink shared channel indicated by the physical downlink control channel, a paging message sent by a network device, where the paging message includes grant-free resource configuration information. In this implementation, the grant-free resource configuration information is carried in the paging message. The terminal device may obtain the grant-free resource configuration information by parsing the paging message. This reduces power consumption of obtaining the paging message and the grant-free resource configuration information by the terminal device through listening.

According to still another aspect of the present disclosure, a grant-free resource configuration method is provided, including: configuring, by a network device, a physical downlink control channel and/or a physical downlink shared channel for sending a paging message on a paging occasion; and sending, by the network device, the paging message on the physical downlink control channel or a physical downlink shared channel indicated by the physical downlink control channel, where the physical downlink control channel is scrambled by using a paging radio network temporary identifier and the paging message includes grant-free resource configuration information. In this implementation, the grant-free resource configuration information is carried in the paging message. This can reduce overheads for sending the grant-free resource configuration information by the network device.

According to still another aspect of the present disclosure, a grant-free resource configuration method is provided, including: sending, by a network device, a paging message on a physical downlink control channel and/or a physical downlink shared channel indicated by the physical downlink control channel, where the physical downlink control channel is scrambled by using a paging radio network temporary identifier and the paging message includes grant-free resource configuration information.

With reference to the foregoing aspects, in one embodiment, the grant-free resource configuration information further includes at least one of the following identifiers: a radio network temporary identifier of a grant-free group, a cell radio network temporary identifier, a logical identifier of a grant-free group, a temporary mobile user identity and an international mobile subscriber identity. The identifier is used to search one or more sets of grant-free resource configuration parameters in the paging message for grant-free resource configuration corresponding to the terminal device.

With reference to the foregoing aspects, in another embodiment, the method further includes: configuring, by the network device, the grant-free resource configuration identifier for the terminal device. For example, if only the paging radio network temporary identifier is configured for the terminal device, the network device needs to configure the logical identifier for the terminal device.

With reference to the foregoing aspects, in another embodiment, the grant-free resource configuration information includes at least one of the following parameters: time domain resource configuration, frequency domain resource configuration, reference signal configuration, a modulation and coding scheme, a transport block size, a quantity of repetitions, a power control parameter, and a hybrid automatic repeat request-related parameter. The identifier is associated with the parameter. The terminal device obtains, by searching an identifier in the paging message, configuration of a parameter corresponding to the identifier in the granted resource configuration information. With reference to the foregoing aspects, in still another embodiment, the physical downlink shared channel and the physical downlink control channel are located in a same subframe or a same slot; or the physical downlink shared channel is located in a subsequent subframe or a subsequent slot indicated by the physical downlink control channel.

Correspondingly, according to still another aspect of the present disclosure, a terminal device is further provided. The terminal device may implement the foregoing communication method. For example, the terminal device may be a chip (such as a baseband chip or a communications chip) or a device (such as a terminal device). The foregoing method may be implemented by using software or hardware, or by hardware executing corresponding software.

In one embodiment, a processor and a memory are included in a structure of the terminal device. The processor is configured to support the apparatus in performing a corresponding function in the foregoing communication method. The memory is configured to be coupled to the processor, and stores a program (an instruction) and/or data appropriate for the apparatus. In one embodiment, the terminal device may further include a communications interface, configured to support communication between the apparatus and another network element.

In another embodiment, the terminal device may include a processing unit and a receiving unit. The processing unit and the receiving unit are respectively configured to implement a listening function and an obtaining function in the foregoing method. For example, the processing unit is configured to listen to, by using a grant-free resource configuration identifier, a physical downlink control channel on a paging occasion. The receiving unit is configured to obtain, on the physical downlink control channel or a physical downlink shared channel indicated by the physical downlink control channel, grant-free resource configuration information sent by a network device.

When the terminal device is a chip, the processing unit may be a processing circuit, and the receiving unit may be an input unit such as an input circuit or a communications interface. When the terminal device is a device, the processing unit may be a processor, and the receiving unit may be a receiver.

In one embodiment, a time unit of the paging occasion includes at least one of the following: a subframe, a slot, a mini-slot, an orthogonal frequency division multiplexing symbol, a millisecond, and a second.

In one embodiment, a physical downlink control channel and/or a physical downlink shared channel for sending a paging message on the paging occasion are/is further configured, and the physical downlink control channel is further scrambled by using a paging radio network temporary identifier.

According to still another aspect of the present disclosure, a network device is further provided. The network device may implement the foregoing communication method. For example, the network device may be a chip (such as a baseband chip or a communications chip) or a device (such as a network device or a baseband processing board). The foregoing method may be implemented by using software or hardware, or by hardware executing corresponding software.

In one embodiment, a processor and a memory are included in a structure of the network device. The processor is configured to support the apparatus in performing a corresponding function in the foregoing communication method. The memory is configured to be coupled to the processor, and stores a program (an instruction) and data appropriate for the apparatus. In one embodiment, the network device may further include a communications interface, configured to support communication between the apparatus and another network element.

In another embodiment, the network device may include a processing unit and a sending unit. The processing unit and the sending unit are respectively configured to implement a configuration function and a sending function in the foregoing method. For example, the processing unit is configured to configure a physical downlink control channel and/or a physical downlink shared channel for sending grant-free resource configuration information on a paging occasion. The sending unit is configured to send the grant-free resource configuration information on the physical downlink control channel or a physical downlink shared channel indicated by the physical downlink control channel, where the physical downlink control channel is scrambled by using a grant-free resource configuration identifier.

When the network device is a chip, the processing unit may be a processing circuit, and the sending unit may be an output unit such as an output circuit or a communications interface. When the network device is a device, the processing unit may be a processor, and the sending unit may be a transmitter.

In one embodiment, a time unit of the paging occasion includes at least one of the following: a subframe, a slot, a mini-slot, an orthogonal frequency division multiplexing symbol, a millisecond, and a second.

In one embodiment, a physical downlink control channel and/or a physical downlink shared channel for sending a paging message on the paging occasion are/is further configured, and the physical downlink control channel is further scrambled by using a paging radio network temporary identifier.

According to still another aspect of the present disclosure, a terminal device is further provided. The terminal device may implement the foregoing communication method. For example, the terminal device may be a chip (such as a baseband chip or a communications chip) or a device (such as a terminal device). The foregoing method may be implemented by using software or hardware, or by hardware executing corresponding software.

In one embodiment, a processor and a memory are included in a structure of the terminal device. The processor is configured to support the apparatus in performing a corresponding function in the foregoing communication method. The memory is configured to be coupled to the processor, and stores a program (an instruction) and/or data appropriate for the apparatus. In one embodiment, the terminal device may further include a communications interface, configured to support communication between the apparatus and another network element.

In another embodiment, the terminal device may include a processing unit and a receiving unit. The processing unit and the receiving unit are respectively configured to implement a listening function and an obtaining function in the foregoing method. For example, the processing unit is configured to listen to, by using a grant-free resource configuration identifier, a physical downlink control channel on a grant-free resource configuration occasion that has a specified offset relative to a paging occasion. The receiving unit is configured to obtain, on the physical downlink control channel or a physical downlink shared channel indicated by the physical downlink control channel, grant-free resource configuration information sent by a network device.

When the terminal device is a chip, the processing unit may be a processing circuit, and the receiving unit may be an input unit such as an input circuit or a communications interface. When the terminal device is a device, the processing unit may be a processor, and the receiving unit may be a receiver.

In one embodiment, a time unit of the paging occasion includes at least one of the following: a subframe, a slot, a mini-slot, an orthogonal frequency division multiplexing symbol, a millisecond, and a second. A time unit of the grant-free resource configuration occasion includes at least one of the following: a subframe, a slot, a mini-slot, an orthogonal frequency division multiplexing symbol, and a millisecond.

In one embodiment, the grant-free resource configuration identifier includes at least one of the following: a grant-free radio network temporary identifier and a cell radio network temporary identifier, where the grant-free radio network temporary identifier is a grant-free resource configuration identifier used by a plurality of terminal devices in a grant-free group, and the cell radio network temporary identifier is a grant-free resource configuration identifier used by a specific terminal device.

According to still another aspect of the present disclosure, a network device is further provided. The network device may implement the foregoing communication method. For example, the network device may be a chip (such as a baseband chip or a communications chip) or a device (such as a network device or a baseband processing board). The foregoing method may be implemented by using software or hardware, or by hardware executing corresponding software.

In one embodiment, a processor and a memory are included in a structure of the network device. The processor is configured to support the apparatus in performing a corresponding function in the foregoing communication method. The memory is configured to be coupled to the processor, and stores a program (an instruction) and data appropriate for the apparatus. In one embodiment, the network device may further include a communications interface, configured to support communication between the apparatus and another network element.

In another embodiment, the network device may include a processing unit and a sending unit. The processing unit and the sending unit are respectively configured to implement a configuration function and a sending function in the foregoing method. For example, the processing unit is configured to configure a physical downlink control channel and/or a physical downlink shared channel for sending grant-free resource configuration information on a grant-free resource configuration occasion that has a specified offset relative to a paging occasion. The sending unit is configured to send the grant-free resource configuration information on the physical downlink control channel or a physical downlink shared channel indicated by the physical downlink control channel, where the physical downlink control channel is scrambled by using a grant-free resource configuration identifier.

When the network device is a chip, the processing unit may be a processing circuit, and the sending unit may be an output unit such as an output circuit or a communications interface. When the network device is a device, the processing unit may be a processor, and the sending unit may be a transmitter.

In one embodiment, a time unit of the paging occasion includes at least one of the following: a subframe, a slot, a mini-slot, an orthogonal frequency division multiplexing symbol, a millisecond, and a second. A time unit of the grant-free resource configuration occasion includes at least one of the following: a subframe, a slot, a mini-slot, an orthogonal frequency division multiplexing symbol, and a millisecond.

In one embodiment, the processing unit is further configured to configure the grant-free resource configuration identifier for the terminal device.

In one embodiment, the grant-free resource configuration identifier includes at least one of the following: a grant-free radio network temporary identifier and a cell radio network temporary identifier, where the grant-free radio network temporary identifier is a grant-free resource configuration identifier used by a plurality of terminal devices in a grant-free group, and the cell radio network temporary identifier is a grant-free resource configuration identifier used by a specific terminal device.

According to still another aspect of the present disclosure, a terminal device is further provided. The terminal device may implement the foregoing communication method. For example, the terminal device may be a chip (such as a baseband chip or a communications chip) or a device (such as a terminal device). The foregoing method may be implemented by using software or hardware, or by hardware executing corresponding software.

In one embodiment, a processor and a memory are included in a structure of the terminal device. The processor is configured to support the apparatus in performing a corresponding function in the foregoing communication method. The memory is configured to be coupled to the processor, and stores a program (an instruction) and/or data appropriate for the apparatus. In one embodiment, the terminal device may further include a communications interface, configured to support communication between the apparatus and another network element.

In another embodiment, the terminal device may include a processing unit and a receiving unit. The processing unit and the receiving unit are respectively configured to implement a listening function and an obtaining function in the foregoing method. For example, the processing unit is configured to listen to, by using a paging radio network temporary identifier, a physical downlink control channel on a grant-free resource configuration occasion that has a specified offset relative to a paging occasion. The receiving unit is configured to obtain, on the physical downlink control channel or a physical downlink shared channel indicated by the physical downlink control channel, grant-free resource configuration information sent by a network device.

When the terminal device is a chip, the processing unit may be a processing circuit, and the receiving unit may be an input unit such as an input circuit or a communications interface. When the terminal device is a device, the processing unit may be a processor, and the receiving unit may be a receiver.

According to still another aspect of the present disclosure, a network device is further provided. The network device may implement the foregoing communication method. For example, the network device may be a chip (such as a baseband chip or a communications chip) or a device (such as a network device or a baseband processing board). The foregoing method may be implemented by using software or hardware, or by hardware executing corresponding software.

In one embodiment, a processor and a memory are included in a structure of the network device. The processor is configured to support the apparatus in performing a corresponding function in the foregoing communication method. The memory is configured to be coupled to the processor, and stores a program (an instruction) and data appropriate for the apparatus. In one embodiment, the network device may further include a communications interface, configured to support communication between the apparatus and another network element.

In another embodiment, the network device may include a processing unit and a sending unit. The processing unit and the sending unit are respectively configured to implement a configuration function and a sending function in the foregoing method. For example, the processing unit is configured to configure a physical downlink control channel and/or a physical downlink shared channel for sending grant-free resource configuration information on a grant-free resource configuration occasion that has a specified offset relative to a paging occasion. The sending unit is configured to send the grant-free resource configuration information on the physical downlink control channel or a physical downlink shared channel indicated by the physical downlink control channel, where the physical downlink control channel is scrambled by using a paging radio network temporary identifier.

When the network device is a chip, the processing unit may be a processing circuit, and the sending unit may be an output unit such as an output circuit or a communications interface. When the network device is a device, the processing unit may be a processor, and the sending unit may be a transmitter.

According to still another aspect of the present disclosure, a terminal device is further provided. The terminal device may implement the foregoing communication method. For example, the terminal device may be a chip (such as a baseband chip or a communications chip) or a device (such as a terminal device). The foregoing method may be implemented by using software or hardware, or by hardware executing corresponding software.

In one embodiment, a processor and a memory are included in a structure of the terminal device. The processor is configured to support the apparatus in performing a corresponding function in the foregoing communication method. The memory is configured to be coupled to the processor, and stores a program (an instruction) and/or data appropriate for the apparatus. In one embodiment, the terminal device may further include a communications interface, configured to support communication between the apparatus and another network element.

In another embodiment, the terminal device may include a processing unit and a receiving unit. The processing unit and the receiving unit are respectively configured to implement a listening function and an obtaining function in the foregoing method. For example, the processing unit is configured to listen to, by using a paging radio network temporary identifier, a physical downlink control channel on a paging occasion. The receiving unit is configured to obtain, on the physical downlink control channel or a physical downlink shared channel indicated by the physical downlink control channel, a paging message sent by a network device, where the paging message includes grant-free resource configuration information.

When the terminal device is a chip, the processing unit may be a processing circuit, and the receiving unit may be an input unit such as an input circuit or a communications interface. When the terminal device is a device, the processing unit may be a processor, and the receiving unit may be a receiver.

According to still another aspect of the present disclosure, a network device is further provided. The network device may implement the foregoing communication method. For example, the network device may be a chip (such as a baseband chip or a communications chip) or a device (such as a network device or a baseband processing board). The foregoing method may be implemented by using software or hardware, or by hardware executing corresponding software.

In one embodiment, a processor and a memory are included in a structure of the network device. The processor is configured to support the apparatus in performing a corresponding function in the foregoing communication method. The memory is configured to be coupled to the processor, and stores a program (an instruction) and data appropriate for the apparatus. In one embodiment, the network device may further include a communications interface, configured to support communication between the apparatus and another network element.

In another embodiment, the network device may include a processing unit and a sending unit. The processing unit and the sending unit are respectively configured to implement a configuration function and a sending function in the foregoing method. For example, the processing unit is configured to configure a physical downlink control channel and/or a physical downlink shared channel for sending a paging message on a paging occasion. The sending unit is configured to send the paging message on the physical downlink control channel or a physical downlink shared channel indicated by the physical downlink control channel, where the physical downlink control channel is scrambled by using a paging radio network temporary identifier, and the paging message includes grant-free resource configuration information.

When the network device is a chip, the processing unit may be a processing circuit, and the sending unit may be an output unit such as an output circuit or a communications interface. When the network device is a device, the processing unit may be a processor, and the sending unit may be a transmitter.

According to still another aspect of the present disclosure, a computer readable storage medium is provided, where the computer readable storage medium stores an instruction, and when the instruction is run on a computer, the computer is enabled to perform the methods according to the foregoing aspects.

According to still another aspect of the present disclosure, a computer program product including an instruction is provided, and when the computer program product runs on a computer, the computer is enabled to perform the methods according to the foregoing aspects.

BRIEF DESCRIPTION OF DRAWINGS

To describe the technical solutions in the embodiments of the present disclosure or in the background more clearly, the following briefly describes the accompanying drawings required for describing the embodiments of the present disclosure or the background.

DESCRIPTION OF EMBODIMENTS

The following describes the embodiments of the present disclosure with reference to the accompanying drawings in the embodiments of the present disclosure.

Figure 1:
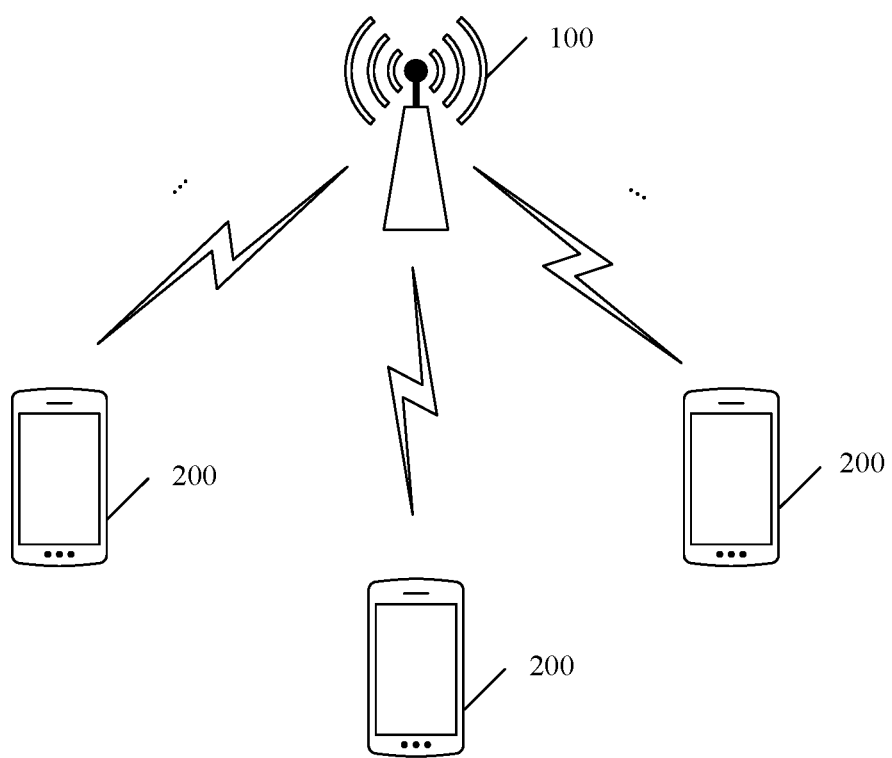
FIG. 1 is a schematic diagram of a communications system according to an embodiment of the present disclosure.

FIG. 1 is a schematic diagram of a communications system. The communications system may include at least one network device 100 (only one is shown) and one or more terminal devices 200 connected to the network device 100.

The network device 100 may be a device that can communicate with the terminal device 200. The network device 100 may be any device with a wireless transceiving function. The network device 100 includes but is not limited to: a base station (for example, a NodeB, an evolved NodeB (eNodeB), a gNodeB in a fifth generation (5G) communications system, a base station or a network device in a future communications system, an access node in a Wi-Fi system, a wireless relay node, or a wireless backhaul node), or the like. The network device 100 may alternatively be a radio controller in a cloud radio access network (CRAN) scenario. The network device 100 may alternatively be a network device in a 5G network or a network device in a future evolved network; or may be a wearable device, a vehicle-mounted device, or the like. The network device 100 may alternatively be a small cell, a transmission reception node (transmission reception point, TRP), or the like. Certainly, the present disclosure is not limited thereto.

The terminal device 200 is a device that has a wireless transceiving function, and may be deployed on land, including an indoor or outdoor device, a handheld device, a wearable device, or a vehicle-mounted device. Alternatively, the terminal 200 may be deployed on water (for example, on a ship). Alternatively, the terminal 200 may be deployed in the air (for example, on an airplane, a balloon, or a satellite). The terminal device may be a mobile phone, a tablet (Pad), a computer with a wireless transceiving function, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. An application scenario is not limited in the embodiments of the present disclosure. Alternatively, the terminal device may sometimes be referred to as user equipment (UE), an access terminal device, a UE unit, a UE station, a mobile station, a remote station, a remote terminal device, a mobile device, a UE terminal device, a terminal device, a wireless communications device, a UE agent, a UE apparatus, or the like.

It should be noted that the terms "system" and "network" in the embodiments of the present disclosure may be used interchangeably. "A plurality of" means two or more than two. In view of this, in the embodiments of the present disclosure, "a plurality of" may also be understood as "at least two". The term "and/or" describes an association relationship between associated objects and indicates that three relationships may exist. For example, A and/or B may indicate the following three cases: Only A exists, both A and B exist, and only B exists. In addition, the character "/", unless otherwise specified, generally indicates an "or" relationship between the associated objects.

Figure 2:
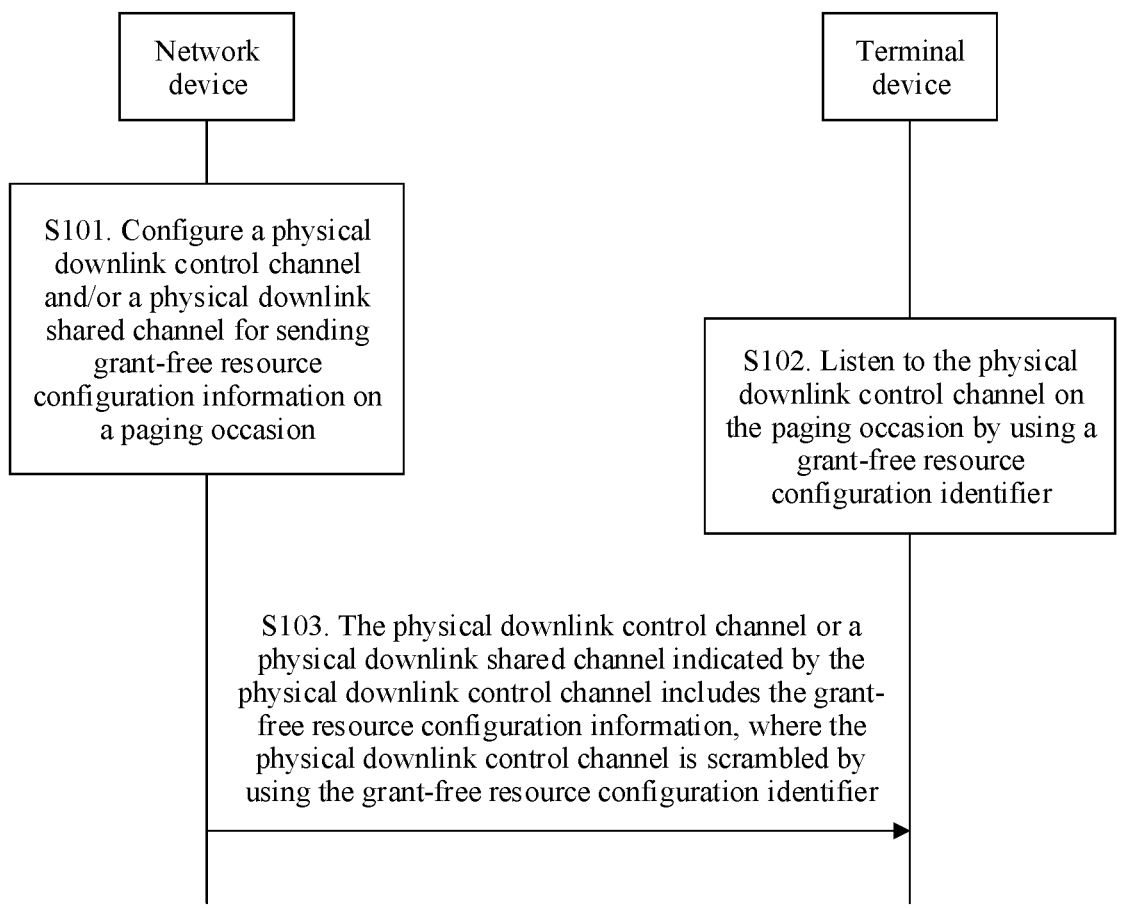
FIG. 2 is a schematic interaction flowchart of a grant-free resource configuration method according to an embodiment of the present disclosure.

FIG. 2 is a schematic interaction flowchart of a grant-free resource configuration method according to an embodiment of the present disclosure. The method may include the following operations:

Operation S101. A network device configures a physical downlink control channel and/or a physical downlink shared channel for sending grant-free resource configuration information on a paging occasion.

Operation S102. A terminal device listens to the physical downlink control channel on the paging occasion by using a grant-free resource configuration identifier.

Operation S103. The network device sends the grant-free resource configuration information on the physical downlink control channel or a physical downlink shared channel indicated by the physical downlink control channel, where the physical downlink control channel is scrambled by using the grant-free resource configuration identifier. The terminal device obtains, on the physical downlink control channel or the physical downlink shared channel indicated by the physical downlink control channel, the grant-free resource configuration information sent by the network device.

For grant-free transmission, the network device needs to preconfigure a grant-free transmission resource for the terminal device. Particularly, when a situation of a resource collision is intensified, more GF resources are needed for the terminal device to choose; or GF resource adjustment is performed based on a link status; or a quantity of GF resources needs to be reduced if a quantity of users is reduced. Therefore, GF resource reconfiguration is required. In this embodiment, the grant-free resource configuration information may be grant-free resource initial configuration information, or may be grant-free resource reconfiguration information. The grant-free resource configuration information includes at least one type of the following information: time domain resource configuration, frequency domain resource configuration, reference signal configuration, a modulation and coding scheme, a transport block size, a quantity of repetitions, a power control parameter, and a hybrid automatic repeat request-related parameter.

As described in Case 1, the terminal device needs to listen to a radio access network paging message or a core network paging message based on a preset period. In other words, the terminal device needs to listen to a paging message on a paging occasion (PO) in the preset period. In this embodiment, when grant-free resource configuration information is initially configured or there is a change in a grant-free resource configuration, the network device sends grant-free resource configuration information on the paging occasion. Specifically, the network device configures a physical downlink control channel (PDCCH) and/or a physical downlink shared channel (PDSCH) for sending the grant-free resource configuration information on the paging occasion. In other words, the configured channel is used to send the grant-free resource configuration information. The grant-free resource configuration information may be located on the PDCCH or the PDSCH, and a time-frequency position of the PDSCH is indicated by the PDCCH. The PDCCH is scrambled by using the grant-free resource configuration identifier. The terminal device listens to the PDCCH on the paging occasion by using the grant-free resource configuration identifier. If the PDCCH scrambled by using the grant-free resource configuration identifier is listened and obtained, the terminal device may obtain the grant-free resource configuration information carried on the PDCCH, or obtain the grant-free resource configuration information carried on the PDSCH indicated by the PDCCH. The PDCCH is scrambled by using the grant-free resource configuration identifier. The terminal device listens to the PDCCH by using the grant-free resource configuration identifier. To be specific, the terminal device checks the scrambled PDCCH by using the identifier. If the check succeeds, it indicates that the PDCCH carries information specific to the terminal device, and the information may include indication information of the PDSCH, or may include the grant-free resource configuration information. Therefore, the terminal device may obtain the grant-free resource configuration information on the paging occasion based on the grant-free resource configuration identifier, and does not need to be woken up frequently to perform listening on another occasion, thereby reducing power consumption of obtaining the grant-free resource configuration information by the terminal device.

In one embodiment, that the PDCCH is scrambled by using the grant-free resource configuration identifier may also be expressed as that the PDCCH is identified by using the grant-free resource configuration identifier, or the PDCCH is addressed by using the grant-free resource configuration identifier (the PDCCH addressed by an RNTI).

In one embodiment, a physical downlink control channel and/or a physical downlink shared channel for sending a paging message on the paging occasion are/is further configured, and the physical downlink control channel is further scrambled by using a paging radio network temporary identifier (P-RNTI). In other words, the network device scrambles the physical downlink control channel on a same paging occasion by using different identifiers, and the terminal device listens to the paging message and the grant-free resource configuration information on the same paging occasion by using different identifiers.

Specifically, that the terminal device obtains, on the physical downlink control channel, the grant-free resource configuration information sent by the network device specifically includes: receiving, by the terminal device from the network device, downlink control information carried on the physical downlink control channel. The downlink control information carries the grant-free resource configuration information. Information carried on the PDCCH is presented in different downlink control information (DCI) formats. The DCI includes a plurality of bits, and a definition of the DCI format provides a meaning of each bit or each combination of a plurality of bits. When the DCI is used, an existing DCI format, for example, DCI format 1 that is used for uplink resource configuration and that is in LTE, may be reused, and the grant-free resource configuration information is added to the DCI. Alternatively, a new DCI format may be defined, and DCI in the newly defined DCI format is used to carry the grant-free resource configuration information.

Specifically, that the terminal device obtains, on the physical downlink shared channel indicated by the physical downlink control channel, the grant-free resource configuration information sent by the network device specifically includes: receiving, by the terminal device from the network device, radio resource control (RRC) signaling carried on the physical downlink shared channel or a media access control control element (MAC CE) carried on the physical downlink shared channel, where the radio resource control signaling or the media access control control element carries the grant-free resource configuration information.

It should be noted that the PDCCH and the PDSCH may be located in a same subframe or a same slot, or the PDSCH is located in a subsequent subframe or a subsequent slot indicated by the PDCCH.

In one embodiment, before S101, the following operation may be further included: The network device configures the grant-free resource configuration identifier for the terminal device. The grant-free resource configuration identifier includes at least one of the following: a grant-free radio network temporary identifier (GF-RNTI) and a cell radio network temporary identifier (C-RNTI). The grant-free radio network temporary identifier is a grant-free resource configuration identifier used by a plurality of terminal devices in a grant-free group. To be specific, the network device may allocate a same grant-free resource configuration identifier to one or more terminal devices that use same grant-free resource configuration. The cell radio network temporary identifier is a grant-free resource configuration identifier used by a specific terminal device. The GF-RNTI and the C-RNTI may be used separately, or may be used together. For example, the network device configures a C-RNTI for each terminal device, and each terminal device can receive grant-free resource configuration information of only the terminal device. For another example, the network device configures a same GF-RNTI for a grant-free group (for example, a cell, or a plurality of terminal devices that use same grant-free resource configuration). Each terminal device in the group can receive grant-free resource configuration information of the group. Then, each terminal device obtains grant-free resource configuration information of the terminal device from the grant-free resource configuration information of the group. When scrambling is performed by using the GF-RNTI, the identifier may be used to configure grant-free resource configuration information for a group of terminals, and the grant-free resource configuration information does not need to be sent one by one to terminals having a same configuration occasion, thereby reducing signaling overheads. For another example, the network device needs to send grant-free resource configuration information to five terminal devices in a cell. Terminal devices A to D may be grouped into one grant-free group, and a terminal device E is separate. In this case, the network device scrambles, by using a GF-RNTI of the group, a PDCCH configured for the group, and the PDCCH or a PDSCH indicated by the PDCCH carries grant-free resource configuration information of the group. The network device scrambles, by using a C-RNTI of the terminal device E, a PDCCH configured for the terminal device, and the PDCCH or a PDSCH indicated by the PDCCH carries grant-free resource configuration information of the terminal device E. In addition, because the terminal devices in the GF group do not necessarily have a same paging occasion, the grant-free resource configuration information needs to be sent for a single terminal device for a plurality of times to reach the terminal devices in the same GF group. Therefore, the C-RNTI is used as a supplement.

In one embodiment, the grant-free radio network temporary identifier (GF-RNTI) may also be referred to as a grant-free cell radio network temporary identifier (GF C-RNTI).

In one embodiment, a period corresponding to a grant-free resource configuration occasion may be set to an integer multiple of a paging cycle. For example, the grant-free resource configuration occasion is configured to arise once every two paging cycles. In the paging cycle that satisfies an integer multiple relationship, the network device configures the grant-free resource configuration occasion and sends the grant-free resource configuration information. Correspondingly, the terminal device listens to, by using the grant-free resource configuration identifier, the physical downlink control channel only on the grant-free resource configuration occasion in the foregoing period. In one embodiment, a period corresponding to a grant-free resource configuration occasion may be set to 1/N of a paging cycle, where N is a positive integer.

To support use of the foregoing two identifiers (used for GF resource configuration), a receiving procedure of the terminal device needs to be defined in a protocol, or receiving processing of the terminal device needs to be indicated by using signaling. The following two cases are distinguished: In one case, the two identifiers are used by default. To be specific, on a PO, the terminal device receives a paging message by using a P-RNTI, and attempts to receive GF configuration information by using the GF-RNTI and the C-RNTI. In this case, whether the network device uses the GF-RNTI or the C-RNTI depends on a network. In the other case, whether one identifier is used or two identifiers are used is notified by using signaling. For example, the network device identifies that POs of terminal devices in a same GF group differ relatively greatly. Then, the network device instructs, by using signaling, the terminal device to receive GF configuration information by using only the C-RNTI. Subsequently, the terminal device receives, on the PO, a paging message by using the P-RNTI and GF resource configuration information by using a specified identifier.

The C-RNTI is an existing identifier of the terminal device. Therefore, if the C-RNTI is used for scrambling, the network device does not need to configure a new identifier, for example, a GF-RNTI, dedicated to sending the grant-free resource configuration information. In addition, when the C-RNTI is used for scrambling the PDCCH, it needs to be distinguished whether a configured grant-free resource is valid for one time or is valid continuously. In one implementation, if the grant-free resource configuration identifier is a cell radio network temporary identifier, the method may further include: sending, by the network device, downlink control information to the terminal device, and receiving, by the terminal device, the downlink control information from the network device. The downlink control information is used to indicate valid time information of a configured grant-free resource. To be specific, indication information is added to the DCI. For example, 1 bit is used to distinguish whether the configured grant-free resource is valid for one time or is valid continuously. In another implementation, an existing DCI format is extended. For example, duration, such as period information, of the configured grant-free resource is added to the DCI. If a valid period value is included, for example, a period value is greater than 0, it is considered that the grant-free resource is valid continuously. In still another implementation, a new DCI format may be further defined, and duration of the configured grant-free resource is added to DCI in the newly defined DCI format.

Figure 3A:
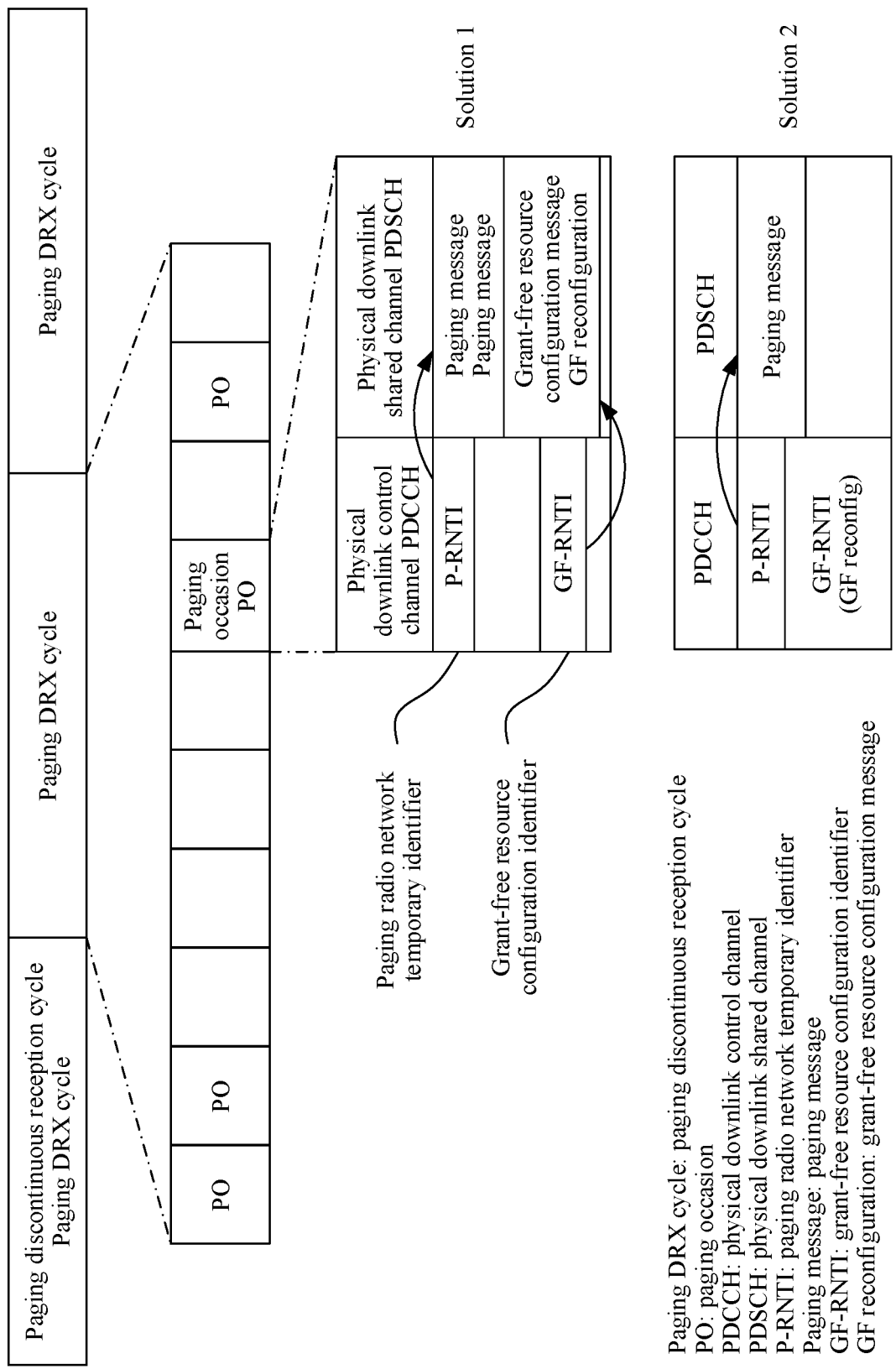
FIG. 3a and FIG. 3b are schematic diagrams in which a terminal device listens to a paging message and grant-free resource configuration information on a paging occasion by using different identifiers.
Figure 3B:
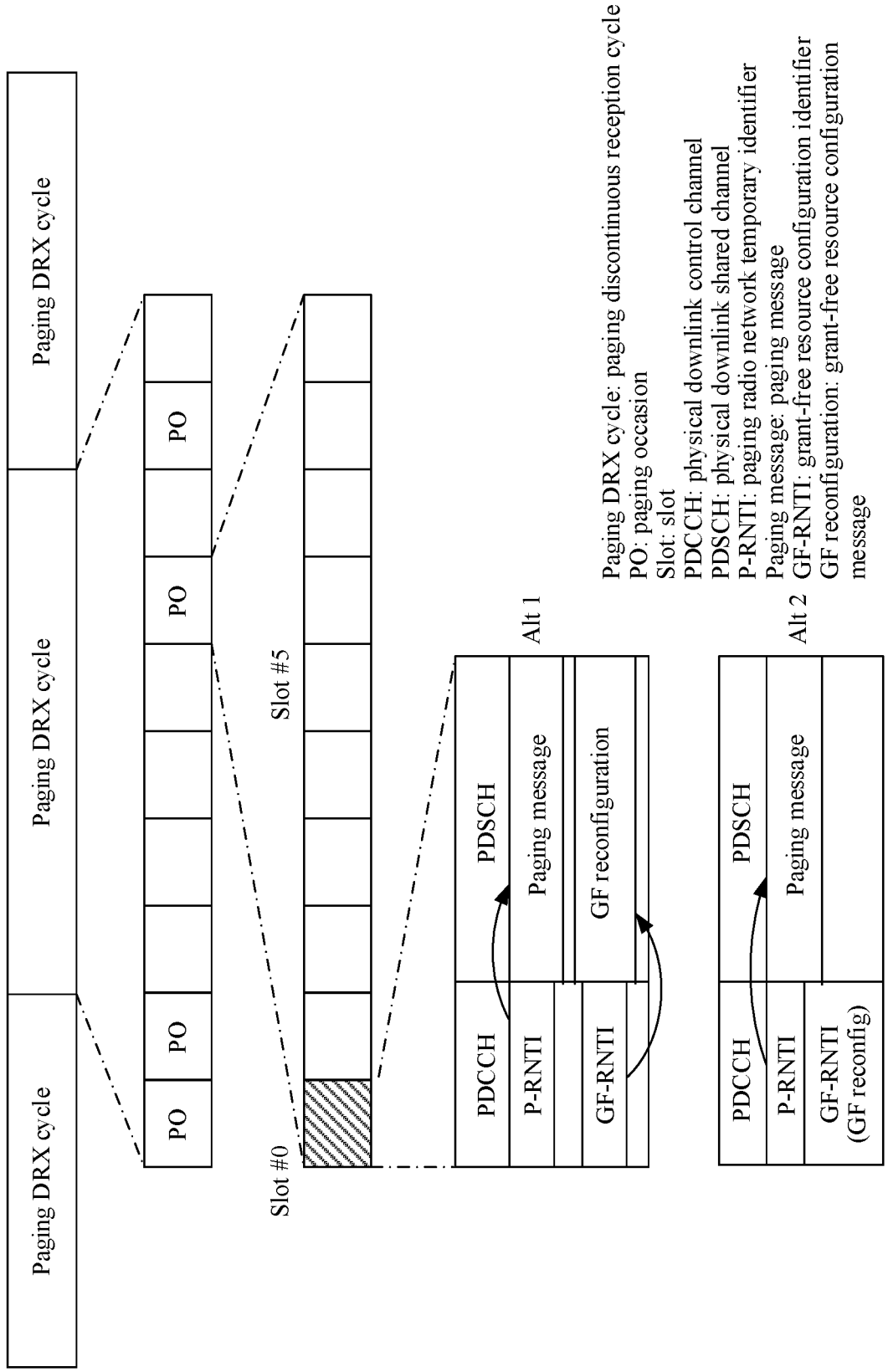

A time unit of the paging occasion includes at least one of the following: a subframe, a slot, a mini-slot, an orthogonal frequency division multiplexing symbol, a millisecond, and a second. For example, FIG. 3a and FIG. 3b are schematic diagrams in which a terminal device listens to a paging message and grant-free resource configuration information on a paging occasion by using different identifiers. As shown in FIG. 3a, the terminal device performs listening on a same PO by separately using a P-RNTI and a GF-RNTI. A paging message and grant-free resource reconfiguration information (GF Reconfiguration) that are listened and obtained may be located on different PDSCHs. The grant-free resource reconfiguration information may also be located on a PDCCH. In the solution in FIG. 3a, the terminal device needs to perform listening on an entire PO. In this case, the PO is equivalent to the paging occasion. One PO may include one or more time units. For example, one PO has a length of one or more subframes. Even if one PO has a length of one subframe, the PO may also include a plurality of slots or mini-slots. For example, if one PO includes a plurality of slots, the paging occasion may be offset at a granularity of a slot. As shown in FIG. 3b, the paging occasion may be a slot, or may be a smaller time unit. In this case, as shown in FIG. 3b, the terminal device needs to perform listening only in some slots to obtain the paging message and the grant-free resource configuration information. Certainly, the paging occasion may alternatively be at a granularity of a millisecond or a second. Alternatively, it may be understood from another perspective that the paging occasion may also be referred to as a PO. In FIG. 3a, a granularity of the PO is a subframe, and in FIG. 3b, a granularity of the PO is a slot, and so on. In addition, for obtaining of the paging occasion, the terminal device obtains a start location of the paging occasion, a start location of the paging occasion in the PO, or a receive slot of the paging occasion in the PO according to a calculation formula or a preset mechanism of paging in LTE. Details are not described herein again. In one embodiment, duration of the PO needs to be explicitly or implicitly notified. For example, it is agreed in a protocol that listening is performed only at a start location that is obtained by using a calculation formula for one unit of time. Alternatively, the duration is provided by using explicit information.

In an alternative manner, operations S102 and S103 may also be understood as the following: The terminal device listens to, on the paging occasion by using a grant-free resource configuration identifier, the grant-free resource configuration information sent by the network device. The grant-free resource configuration identifier is used to scramble a physical downlink control channel corresponding to the grant-free resource configuration information. The grant-free resource configuration information is carried on the physical downlink control channel or a physical downlink shared channel indicated by the physical downlink control channel. The network device sends, on the paging occasion, the grant-free resource configuration information on the physical downlink control channel or the physical downlink shared channel indicated by the physical downlink control channel. The physical downlink control channel is scrambled by using the grant-free resource configuration identifier.

According to the grant-free resource configuration method in this embodiment of the present disclosure, the terminal device listens to the physical downlink control channel on a same paging occasion by using different identifiers, and obtains the grant-free resource configuration information. A configuration occasion is preset, to ensure that the grant-free resource configuration information can be effectively received by the terminal device. In addition, the grant-free resource configuration identifier is used, to facilitate grant-free resource configuration for the terminal device.

Figure 4:
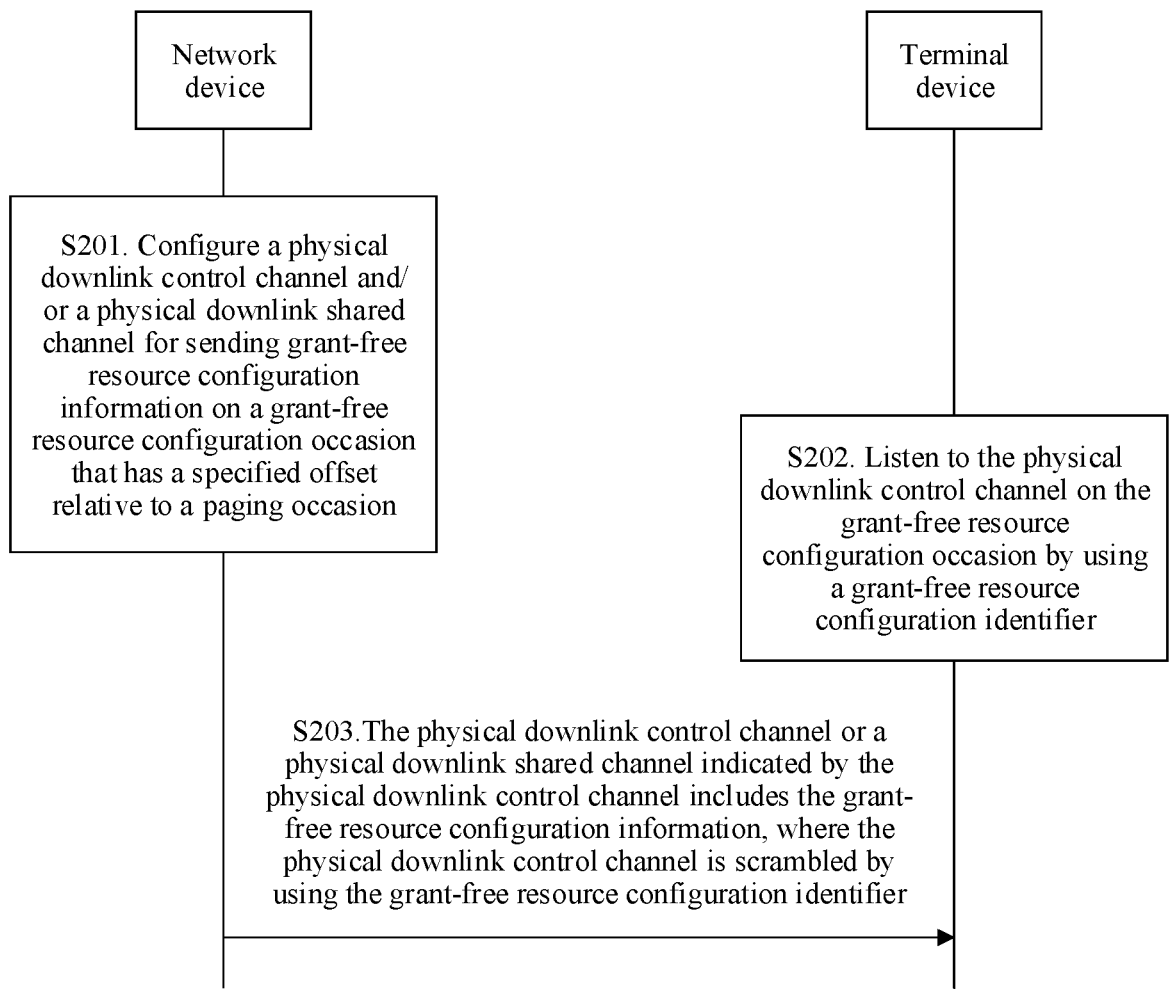
FIG. 4 is a schematic interaction flowchart of another grant-free resource configuration method according to an embodiment of the present disclosure.

FIG. 4 is a schematic interaction flowchart of another grant-free resource configuration method according to an embodiment of the present disclosure. The method may include the following operations:

Operation S201. A network device configures a physical downlink control channel and/or a physical downlink shared channel for sending grant-free resource configuration information on a grant-free resource configuration occasion that has a specified offset relative to a paging occasion.

Operation S202. A terminal device listens to the physical downlink control channel on the grant-free resource configuration occasion by using a grant-free resource configuration identifier.

Operation S203. The network device sends the grant-free resource configuration information on the physical downlink control channel or a physical downlink shared channel indicated by the physical downlink control channel, where the physical downlink control channel is scrambled by using the grant-free resource configuration identifier. The terminal device obtains, on the physical downlink control channel or the physical downlink shared channel indicated by the physical downlink control channel, the grant-free resource configuration information sent by the network device.

Different from the embodiment shown in FIG. 2, in this embodiment, the network device sends, on the grant-free resource configuration occasion that has the specified offset relative to the paging occasion, the grant-free resource configuration information on a PDCCH or a PDSCH indicated by the PDCCH, where the PDCCH is scrambled by using the grant-free resource configuration identifier. The grant-free resource configuration occasion and the paging occasion may be located in duration of a same period. The specified offset may be sent by using a system message, or may be carried in RRC signaling or a MAC CE during grant-free resource initial configuration. Similarly, the grant-free resource configuration information may be sent on a PDCCH or a PDSCH. For another implementation, refer to the embodiment shown in FIG. 2.

In one embodiment, a period corresponding to the grant-free resource configuration occasion may be set to an integer multiple of a paging cycle. For example, it is configured that the grant-free resource configuration occasion arises once every two paging cycles. The network device sends the grant-free resource configuration information on the grant-free resource configuration occasion that has the specified offset relative to the paging occasion in the paging cycle that satisfies an integer multiple relationship. Correspondingly, the terminal device listens to the physical downlink control channel only on the grant-free resource configuration occasion in the foregoing period by using the grant-free resource configuration identifier.

In one embodiment, a PDCCH and/or a PDSCH for sending a paging message on a paging occasion are/is further configured, where the PDDCH is scrambled by using a P-RNTI. To be specific, the network device configures corresponding PDCCHs or PDSCHs on different occasions and scrambles the paging message and the grant-free resource configuration information by using different identifiers. Then, the terminal device separately receives the paging message and the grant-free resource configuration information on the different occasions by using the different identifiers.

Figure 5A:
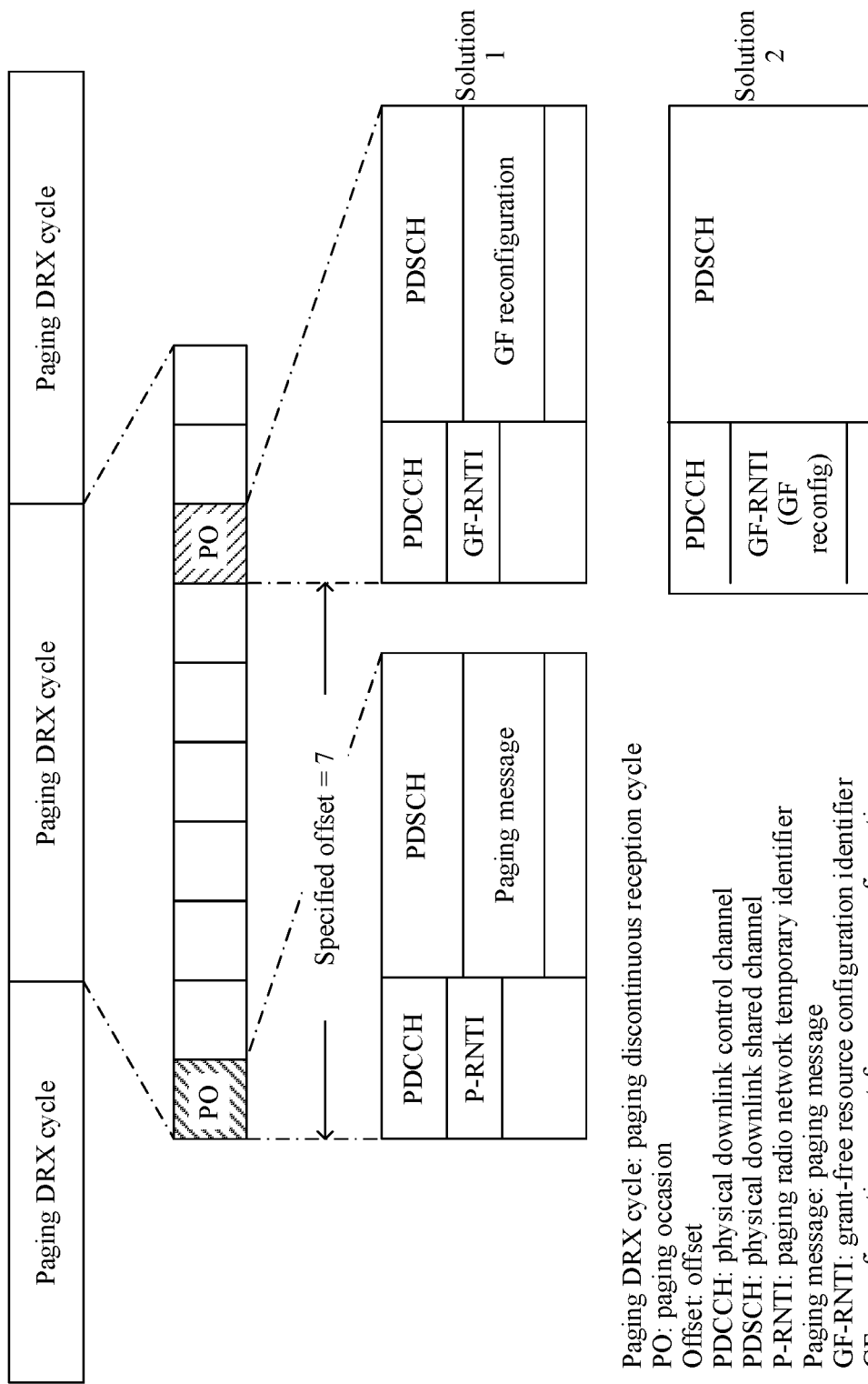
FIG. 5a and FIG. 5b are schematic diagrams in which a terminal device separately receives a paging message and grant-free resource configuration information on different paging occasions by using different identifiers.
Figure 5B:
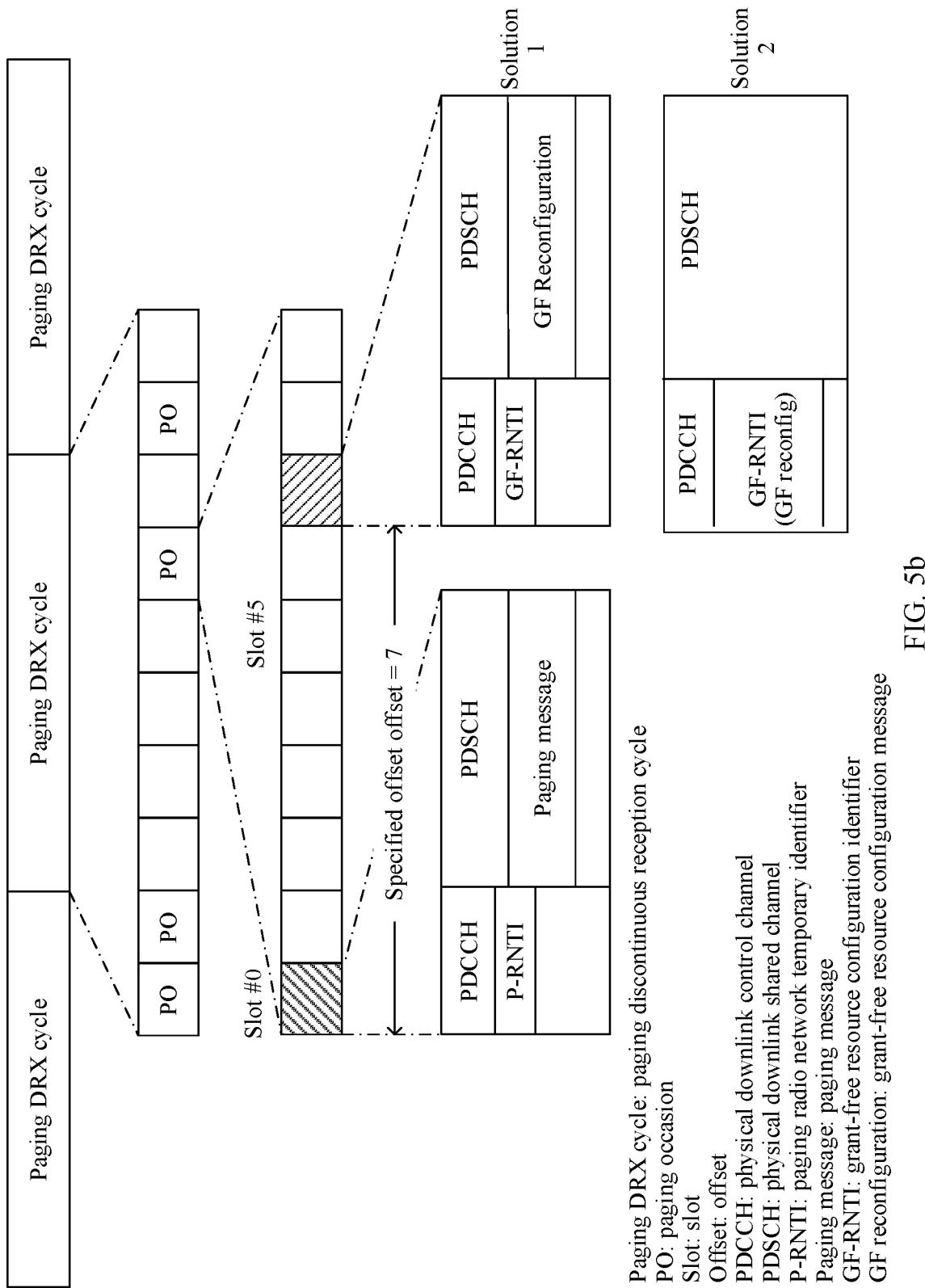

A time unit of the paging occasion includes at least one of the following: a subframe, a slot, a mini-slot, an orthogonal frequency division multiplexing symbol, a millisecond, and a second. A time unit of the grant-free resource configuration occasion includes at least one of the following: a subframe, a slot, a mini-slot, an orthogonal frequency division multiplexing symbol, and a millisecond. FIG. 5a and FIG. 5b are schematic diagrams in which a terminal device separately receives a paging message and grant-free resource configuration information on different paging occasions by using different identifiers. As shown in FIG. 5a, the terminal device performs listening on a paging occasion and a grant-free resource configuration occasion (on different POs) by separately using a P-RNTI and a GF-RNTI. The paging message and the GF reconfiguration that are listened and obtained may be located on different PDSCHs. The GF reconfiguration may also be located on a PDCCH.

In this embodiment, the terminal device separately receives the paging message and the grant-free resource configuration information on different occasions, so that complexity of receiving can be reduced. In addition, because the physical downlink control channel is scrambled by using the grant-free resource configuration identifier, the grant-free resource configuration information can only be received by terminal devices in a grant-free group or a specific terminal device. Therefore, grant-free resource configuration is easier and more convenient.

According to the grant-free resource configuration method in this embodiment of the present disclosure, the terminal device obtains the grant-free resource configuration information on different occasions by using different identifiers. Therefore, it is ensured that time-frequency resources are sufficient for sending control information (such as paging information and grant-free resource configuration information) on each occasion. In addition, because the physical downlink control channel is scrambled by using the grant-free resource configuration identifier, the grant-free resource configuration information can only be received by terminal devices in a grant-free group or a specific terminal device. Therefore, grant-free resource configuration is easier and more convenient.

Figure 6:
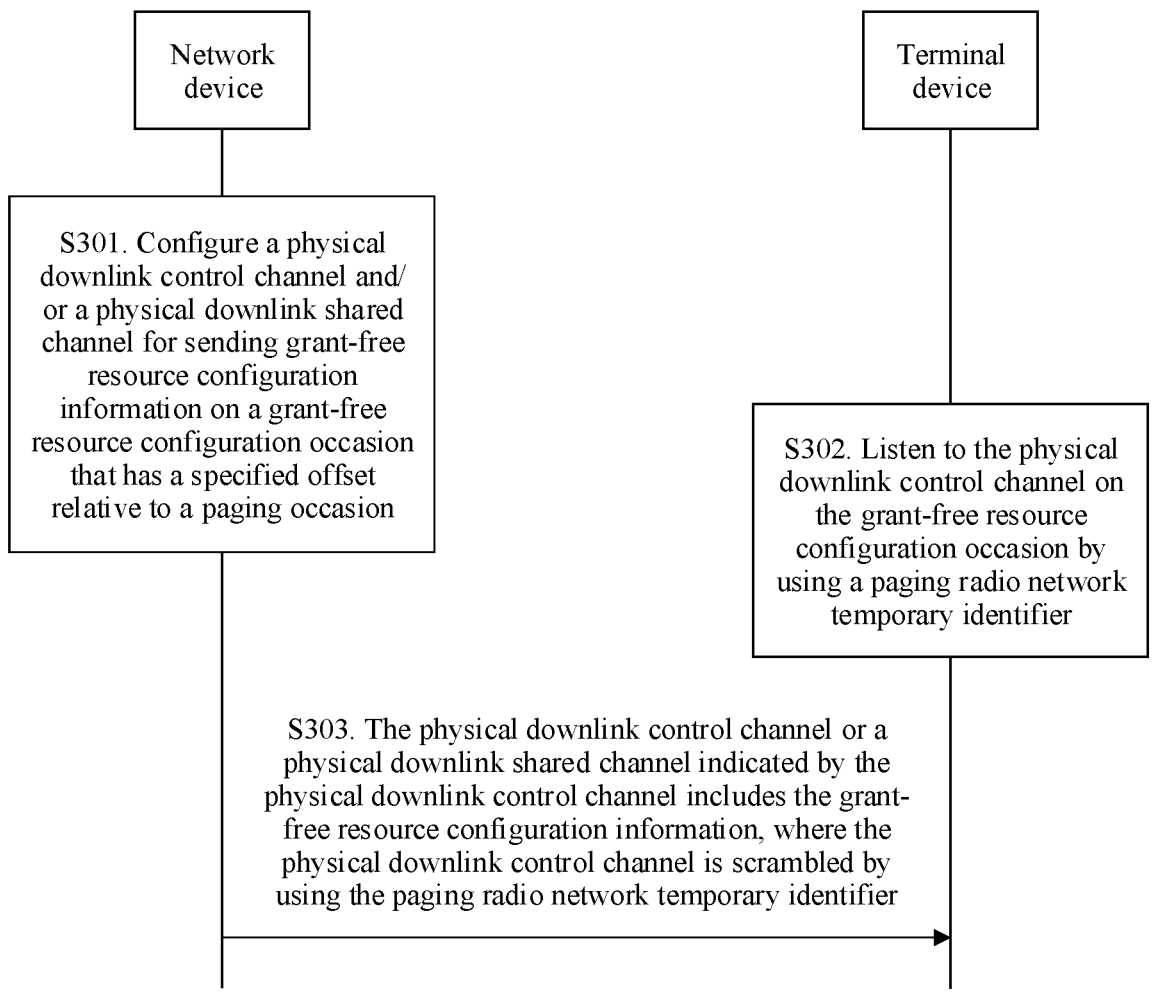
FIG. 6 is a schematic interaction flowchart of still another grant-free resource configuration method according to an embodiment of the present disclosure.

FIG. 6 is a schematic interaction flowchart of still another grant-free resource configuration method according to an embodiment of the present disclosure. The method may include the following operations:

Operation S301. A network device configures a physical downlink control channel and/or a physical downlink shared channel for sending grant-free resource configuration information on a grant-free resource configuration occasion that has a specified offset relative to a paging occasion.

Operation S302. A terminal device listens to the physical downlink control channel on the grant-free resource configuration occasion by using a paging radio network temporary identifier.

Operation S303. The network device sends the grant-free resource configuration information on the physical downlink control channel or a physical downlink shared channel indicated by the physical downlink control channel, where the physical downlink control channel is scrambled by using the paging radio network temporary identifier. The terminal device obtains, on the physical downlink control channel or the physical downlink shared channel indicated by the physical downlink control channel, the grant-free resource configuration information sent by the network device.

Different from the foregoing embodiment, in this embodiment, the network device scrambles the PDCCH by using a P-RNTI and sends, on the grant-free resource configuration occasion that has the specified offset relative to the paging occasion, the grant-free resource configuration information on a PDCCH or a PDSCH indicated by the PDCCH. The terminal device listens to, by using the P-RNTI, a PDCCH on the grant-free resource configuration occasion that has the specified offset relative to the paging occasion. After listening and detecting, on the occasion, a PDCCH that is scrambled by using the P-RNTI and that is associated with the terminal device, the terminal device obtains the grant-free resource configuration information on the PDCCH or a PDSCH indicated by the PDCCH. Usually, the grant-free resource configuration occasion and the paging occasion may be located in a same period. For another implementation, refer to the foregoing embodiment.

In one embodiment, a PDCCH and/or a PDSCH for sending a paging message on the paging occasion are/is further configured, where the PDDCH is scrambled by using the P-RNTI. To be specific, the network device configures corresponding PDCCHs or PDSCHs on different occasions and scrambles the PDCCHs by using the P-RNTI. The paging message and the grant-free resource configuration information are carried on the PDCCHs or PDSCHs indicated by the PDCCHs. The terminal device listens to the PDCCHs and receives the paging message and the grant-free resource configuration information on different occasions by using the P-RNTI.

Figure 7A:
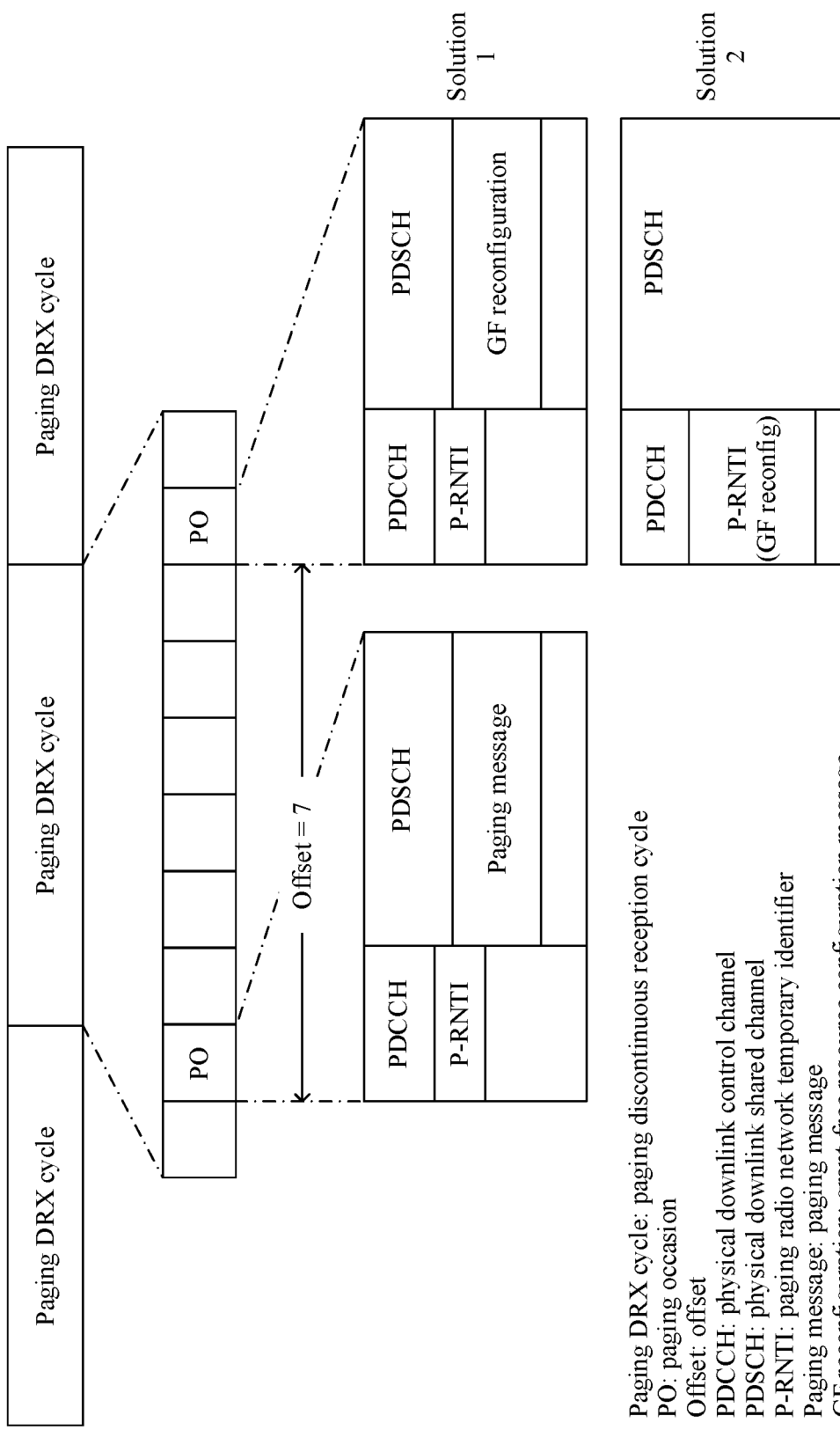
FIG. 7a and FIG. 7b are schematic diagrams in which a terminal device separately receives a paging message and grant-free resource configuration information on different paging occasions by using a P-RNTI.
Figure 7B:
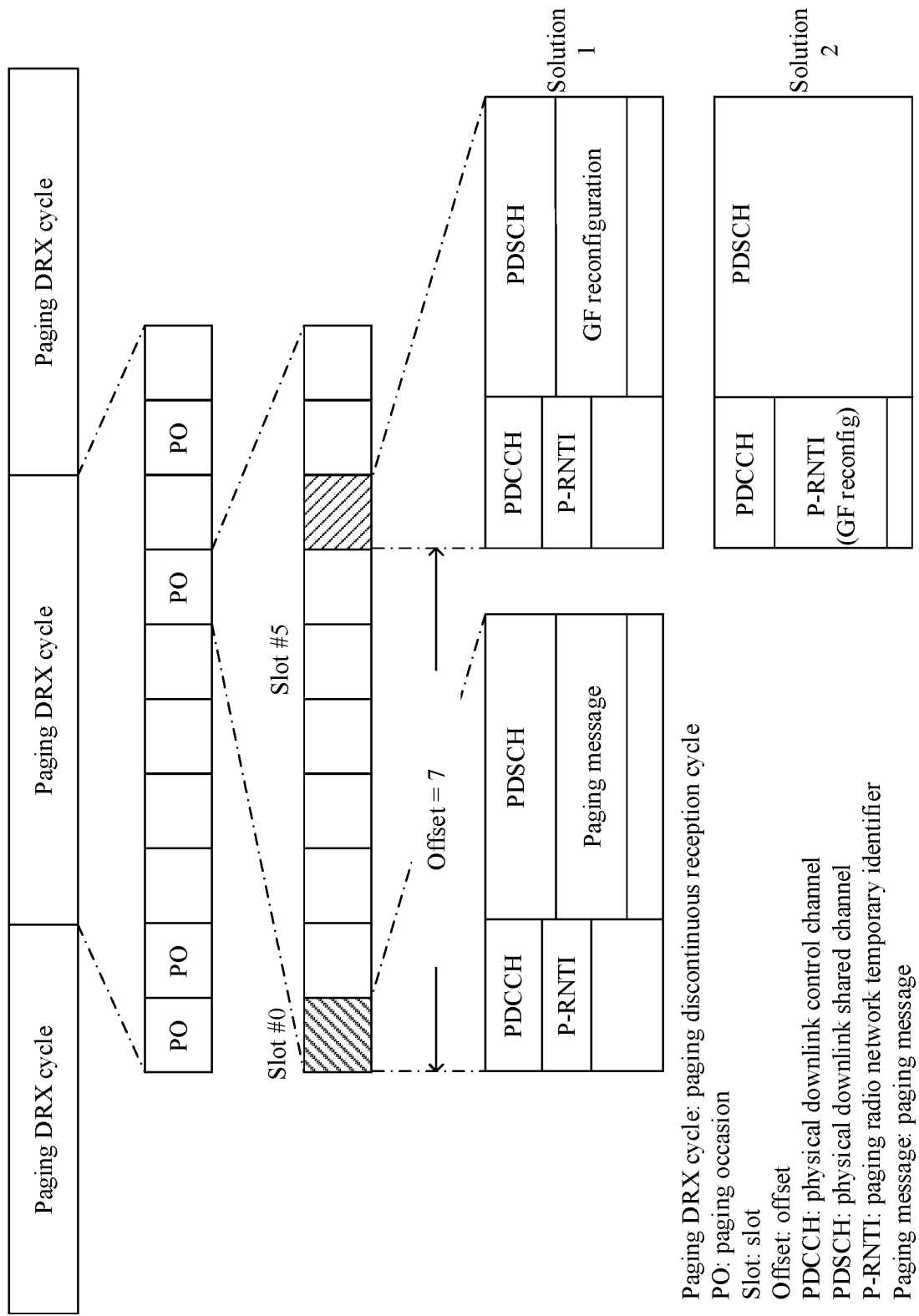

A time unit of the paging occasion includes at least one of the following: a subframe, a slot, a mini-slot, an orthogonal frequency division multiplexing symbol, a millisecond, and a second. A time unit of the grant-free resource configuration occasion includes at least one of the following: a subframe, a slot, a mini-slot, an orthogonal frequency division multiplexing symbol, and a millisecond. FIG. 7a and FIG. 7b are schematic diagrams in which a terminal device separately receives a paging message and grant-free resource configuration information on different paging occasions by using a P-RNTI. As shown in FIG. 7a, the terminal device separately performs listening on different POs by using the P-RNTI. A paging message and GF reconfiguration that are listened and obtained may be located on different PDSCHs. The GF reconfiguration may also be located on a PDCCH.

In this embodiment, the network device distinguishes and sends the paging message and the grant-free resource configuration information based on different occasions. Other configuration is not required for sending the grant-free resource configuration information. This is easy and convenient for implementation. The terminal device listens to, by using the P-RNTI, the grant-free resource configuration information on the grant-free resource configuration occasion that is in a same period as the paging occasion. Allocation of a new identifier is not required. This reduces overheads of signaling configured for sending the new identifier.

According to the grant-free resource configuration method in this embodiment of the present disclosure, different information is distinguished based on different occasions. The terminal device listens to the PDCCH on the grant-free resource configuration occasion by using the paging radio network temporary identifier, and then obtains the grant-free resource configuration information. This is easy and convenient for implementation, and can reduce power consumption of obtaining the grant-free resource configuration information by the terminal device through listening.

Figure 8:
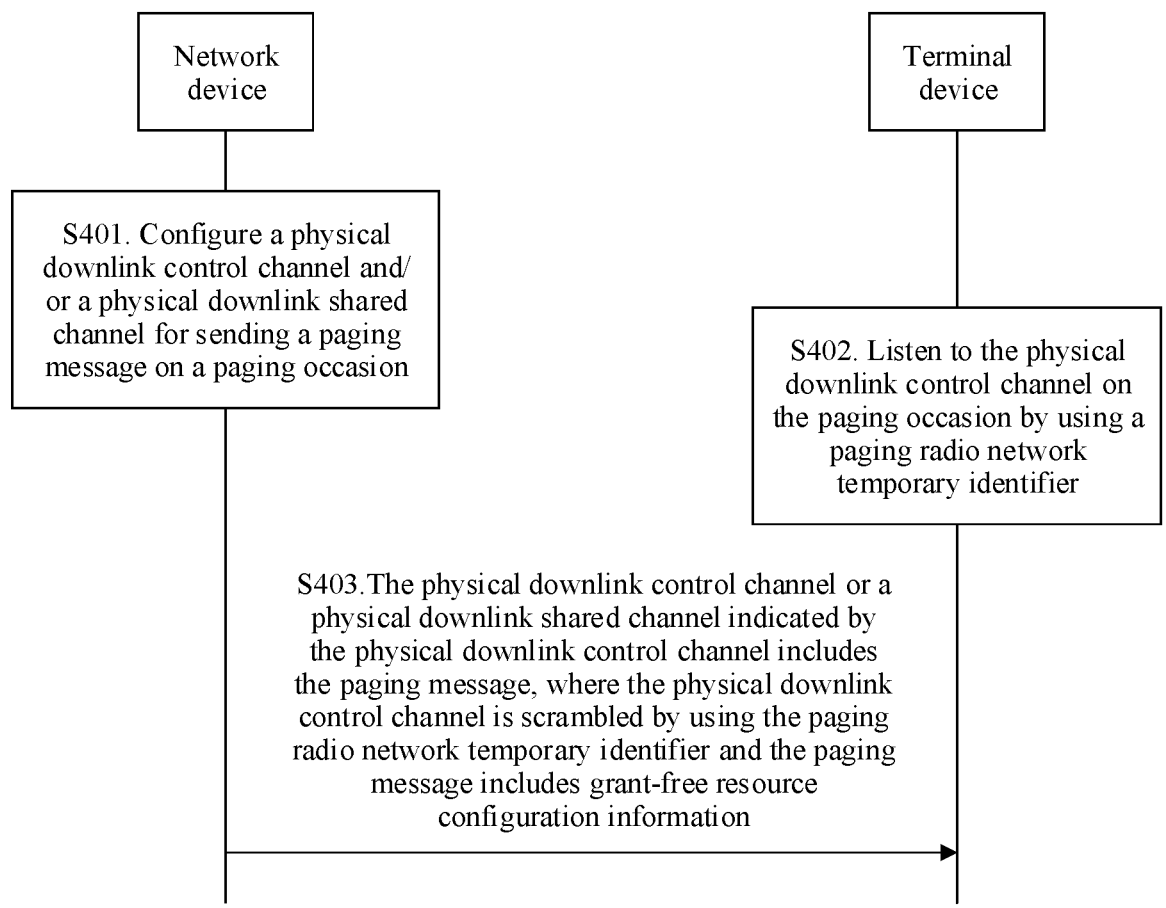
FIG. 8 is a schematic interaction flowchart of yet another grant-free resource configuration method according to an embodiment of the present disclosure.

FIG. 8 is a schematic interaction flowchart of still another grant-free resource configuration method according to an embodiment of the present disclosure. The method may include the following operations:

Operation S401. A network device configures a physical downlink control channel and/or a physical downlink shared channel for sending grant-free resource configuration information on a paging occasion.

Operation S402. A terminal device listens to the physical downlink control channel on the paging occasion by using a paging radio network temporary identifier.

Operation S403. The network device sends the paging message on the physical downlink control channel or a physical downlink shared channel indicated by the physical downlink control channel. The terminal device obtains, on the physical downlink control channel or the physical downlink shared channel indicated by the physical downlink control channel, the paging message sent by the network device. The physical downlink control channel is scrambled by using the paging radio network temporary identifier, and the paging message includes grant-free resource configuration information.

Different from the foregoing embodiment, in this embodiment, the network device sends, only on the paging occasion, the paging message on a PDCCH or a PDSCH indicated by the PDCCH, where the PDCCH is scrambled by using the P-RNTI. The grant-free resource configuration information is included in the paging message. The terminal device listens to a PDCCH only on the paging occasion by using the P-RNTI and may obtain, from the paging message, the grant-free resource configuration information included in the paging message.

Specifically, the paging message has a plurality of fields. In this embodiment, the paging message is extended, and a grant-free resource configuration list (GFRecordList) is added. The GFRecordList includes one or more sets of grant-free resource configuration (GFRecord). Each GFRecord further includes at least the following: (1) a logical identifier of a grant-free group or a terminal identifier, and (2) grant-free resource reconfiguration information, for example, information such as a time-frequency resource used for grant-free transmission. The terminal identifier includes a GF-RNTI, a C-RNTI, a temporary mobile user identity, an international mobile subscriber identity, or the like. The grant-free resource configuration information includes at least one type of the following information: time domain resource configuration, frequency domain resource configuration, reference signal configuration, a modulation and coding scheme, a transport block size, a quantity of repetitions, a power control parameter, and a hybrid automatic repeat request-related parameter.

Figure 9A:
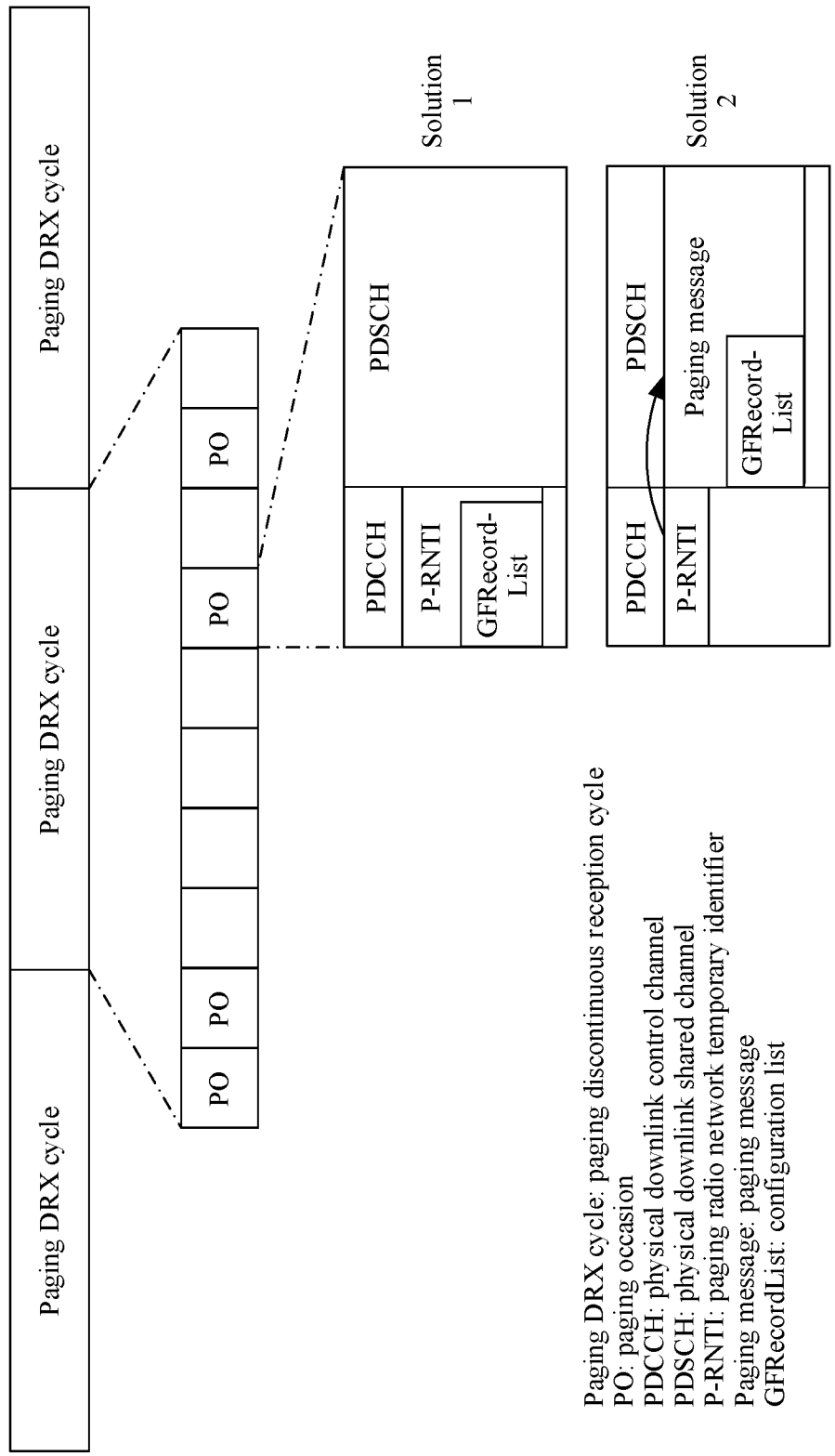
FIG. 9a and FIG. 9b are schematic diagrams of carrying grant-free resource configuration information in a paging message.
Figure 9B:
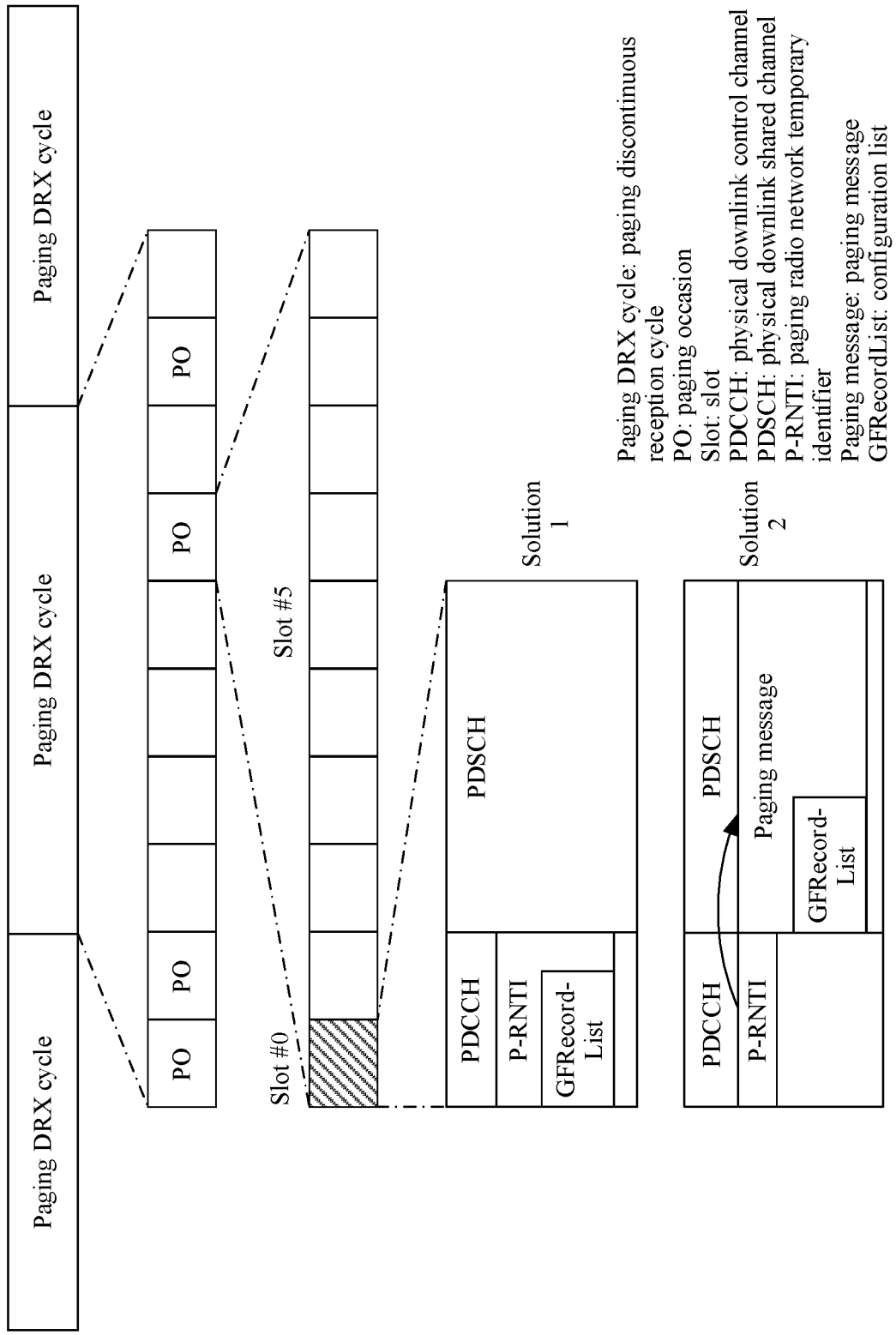

FIG. 9a and FIG. 9b are schematic diagrams of carrying grant-free resource configuration information in a paging message. As shown in FIG. 9a, a terminal device listens to a PDCCH and receives a paging message on a PO. The received paging message may be located on the PDCCH. Correspondingly, GFRecordList is included in the paging message located on the PDCCH. The paging message may also be located on a PDSCH. Correspondingly, GFRecordList is included in the paging message located on the PDSCH. In the solution in FIG. 9a, the terminal device needs to perform listening on an entire PO. As shown in FIG. 9b, a paging occasion may be a slot, or may be a smaller time unit. In this way, as shown in FIG. 9b, the terminal device only needs to listen to some slots to obtain the paging message. Similarly, in FIG. 9b, GFRecordList is included in a paging message located on a PDCCH, or may be included in a paging message located on a PDSCH. In addition, indication information may be added to the paging message to indicate whether the paging message carries the grant-free resource configuration information. For example, 1-bit information is used. When a value is '0', it indicates that the paging message does not carry the grant-free resource configuration information. When the value is '1', it indicates that the paging message carries the grant-free resource configuration information.

If the paging message includes the grant-free resource configuration list, the terminal device searches the grant-free resource configuration list for an identifier carried in grant-free resource configuration. If the identifier is the same as an identifier of the terminal device, the terminal device further obtains grant-free resource reconfiguration information or parameter configuration in the grant-free resource configuration.

According to the grant-free resource configuration method in this embodiment of the present disclosure, the grant-free resource configuration information is carried in the paging message. The terminal device may obtain the grant-free resource configuration information by parsing the paging message. This reduces power consumption of obtaining the paging message and the grant-free resource configuration information by the terminal device through listening.

In still another embodiment, performing GF resource configuration may further be: listening to, by a terminal device, a paging message in each paging cycle, and adding a new period for listening to GF resource configuration information. The terminal device listens to the GF resource configuration information in each GF resource configuration period. A method for configuring a period for listening to the GF resource configuration information and a method for obtaining a listening occasion are the same as the method for configuring a paging occasion and the method for obtaining a paging occasion. For example, a grant-free resource configuration occasion is calculated by using a same formula and a same mechanism. A network device needs to configure a new value of a period for the terminal device. In one embodiment, the network device needs to configure, for the terminal device, a parameter used to determine a start location of a grant-free resource configuration occasion in each period. In one embodiment, the network device needs to configure, for the terminal device, a parameter used to determine duration of a grant-free resource configuration occasion in each period.

The foregoing describes the methods in the embodiments of the present disclosure in detail, and the following provides apparatuses in the embodiments of the present disclosure.

In the embodiments of the present disclosure, functional modules of the terminal device or the network device may be divided based on the foregoing method examples. For example, each functional module may be divided based on each corresponding function, or two or more functions may be integrated into one processing module. The integrated module may be implemented in a form of hardware, or may be implemented in a form of a software functional module. It should be noted that, in the embodiments of the present disclosure, module division is an example, and is merely a logical function division. In actual implementation, another division manner may be used. The following uses an example in which each function module is divided based on each corresponding function for description.

Figure 10:
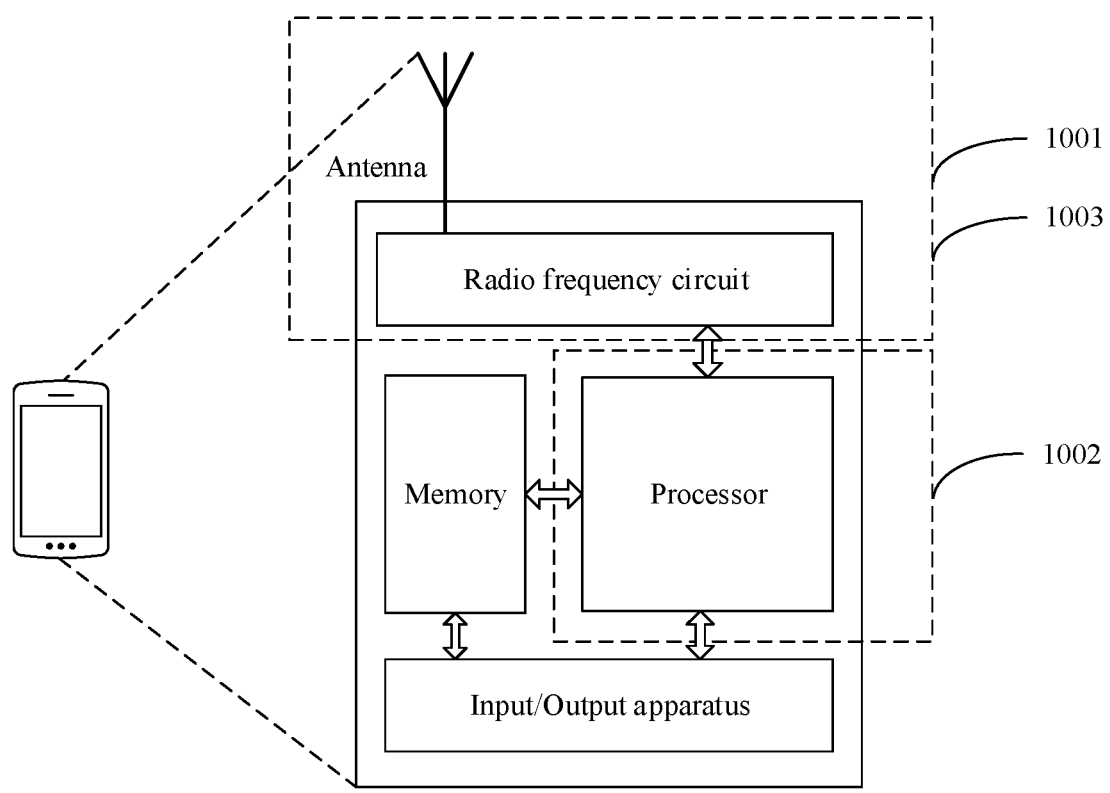
FIG. 10 is a simplified schematic structural diagram of a terminal device according to an embodiment of the present disclosure.

FIG. 10 is a simplified schematic structural diagram of a terminal device. For ease of understanding and illustration, an example in which the terminal device is a mobile phone is used in FIG. 10. As shown in FIG. 10, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store software program and data. The radio frequency circuit is mainly configured to: perform conversion between a baseband signal and a radio frequency signal, and process the radio frequency signal. The antenna is mainly configured to transmit and receive a radio frequency signal in an electromagnetic wave form. The input/output apparatus such as a touchscreen, a display, or a keyboard, is mainly configured to: receive data input by a user, and output data to the user. It should be noted that some types of terminal devices may not have the input/output apparatus.

When data needs to be sent, the processor performs baseband processing on the to-be-sent data, and then outputs a baseband signal to the radio frequency circuit. After performing radio frequency processing on the baseband signal, the radio frequency circuit sends a radio frequency signal in an electromagnetic wave form by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 10 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of the present disclosure.

In this embodiment of the present disclosure, the antenna and the radio frequency circuit that have a transceiving function may be considered as a receiving unit and a sending unit of the terminal device (which may also be collectively referred to as a transceiver unit), and the processor that has a processing function may be considered as a processing unit of the terminal device. As shown in FIG. 10, the terminal device includes a receiving unit 1001, a processing unit 1002, and a sending unit 1003. The receiving unit 1001 may also be referred to as a receiver, a receiver circuit, or the like. The sending unit 1003 may also be referred to as a transmitter, a transmitter circuit, or the like. The processing unit may also be referred to as a processor, a processing board, a processing module, a processing apparatus, or the like.

For example, in an embodiment, the processing unit 1002 is configured to perform operation S102 in the embodiment shown in FIG. 2, and the receiving unit 1001 is configured to perform operation S103 in the embodiment shown in FIG. 2.

For another example, in another embodiment, the processing unit 1002 is configured to perform operation S202 in the embodiment shown in FIG. 4, and the receiving unit 1001 is configured to perform operation S203 in the embodiment shown in FIG. 4.

For another example, in another embodiment, the processing unit 1002 is configured to perform operation S302 in the embodiment shown in FIG. 6, and the receiving unit 1001 is configured to perform operation S303 in the embodiment shown in FIG. 6.

For another example, in another embodiment, the processing unit 1002 is configured to perform operation S402 in the embodiment shown in FIG. 8, and the receiving unit 1001 is configured to perform operation S403 in the embodiment shown in FIG. 8.

Figure 11:
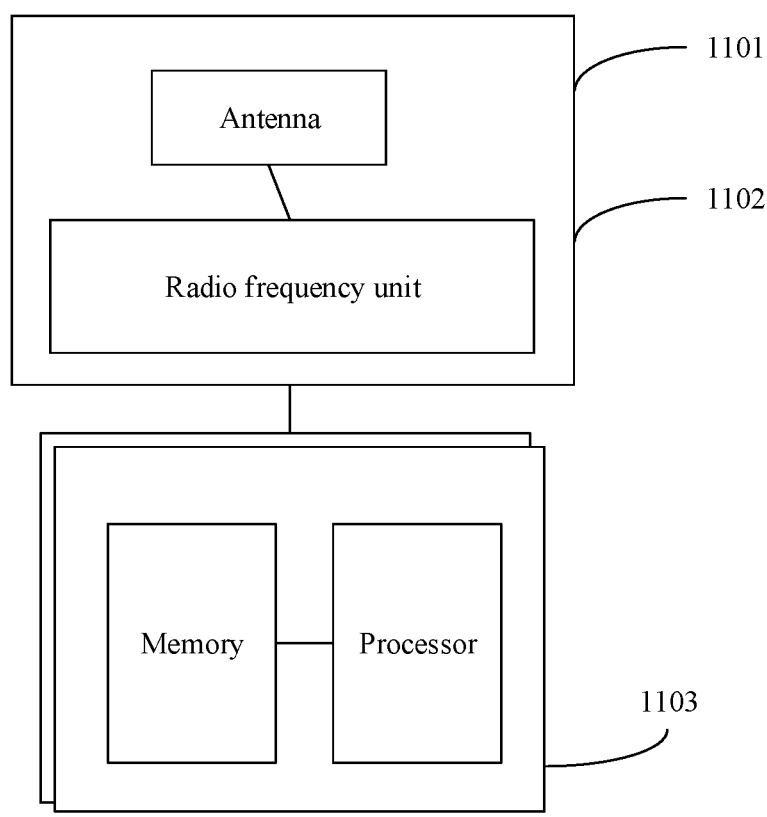
FIG. 11 is a simplified schematic structural diagram of a network device according to an embodiment of the present disclosure.

FIG. 11 is a simplified schematic structural diagram of a network device. The network device includes a part for receiving and sending a radio frequency signal and performing conversion, and a part: a processing unit 1103. The part for receiving and sending a radio frequency signal and performing conversion further includes the following two parts: a receiving unit 1101 and a sending unit 1102 (which may also be collectively referred to as a transceiver unit). The part for receiving and sending a radio frequency signal and performing conversion is mainly configured to: send and receive a radio frequency signal and perform conversion between a radio frequency signal and a baseband signal. The part 1103 is mainly configured to perform baseband processing and control the network device. The receiving unit 1101 may also be referred to as a receiver, a receiver circuit, or the like. The sending unit 1102 may also be referred to as a transmitter, a transmitter circuit, or the like. The part 1103 is usually a control center of the network device, and is usually referred to as a processing unit. For details, refer to descriptions of the foregoing related parts.

The part 1103 may include one or more boards. Each board may include one or more processors and one or more memories. The processor is configured to read and execute a program in the memory to implement a baseband processing function and control the network device. If there are a plurality of boards, the boards may be interconnected to improve a processing capability. In one embodiment, a plurality of boards may share one or more processors, or a plurality of boards may share one or more memories, or a plurality of boards may simultaneously share one or more processors.

For example, in an embodiment, the processing unit 1103 is configured to perform operation S101 in the embodiment shown in FIG. 2, and the sending unit 1102 is configured to perform operation S103 in the embodiment shown in FIG. 2.

For another example, in another embodiment, the processing unit 1103 is configured to perform operation S201 in the embodiment shown in FIG. 4, and the sending unit 1102 is configured to perform operation S203 in the embodiment shown in FIG. 4.

For another example, in another embodiment, the processing unit 1103 is configured to perform operation S301 in the embodiment shown in FIG. 6, and the sending unit 1102 is configured to perform operation S303 in the embodiment shown in FIG. 6.

For another example, in another embodiment, the processing unit 1103 is configured to perform operation S401 in the embodiment shown in FIG. 8, and the sending unit 1102 is configured to perform operation S403 in the embodiment shown in FIG. 8.

For another example, in another embodiment, with development of system on chip (SoC) technologies, some or all of functions of the part 1101, the part 1102 and the part 1103 may be implemented by using the SoC technology, for example, implemented by using a base station function chip. The base station function chip is integrated with devices such as a processor, a memory, and an antenna interface, a program of a base station-related function is stored in the memory, and the program is executed by the processor to implement the base station-related function. In one embodiment, the base station function chip can also read a memory outside the chip to implement the base station-related function.

For explanations and beneficial effects of related content in any communications apparatus provided above, refer to the corresponding method embodiment provided above. Details are not described herein again. A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present disclosure, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented or partially in a form of a computer program product. The computer program product includes one or more computer instructions (programs or code). When the computer program instructions are loaded and executed on a computer, the processes or functions according to the embodiments of the present disclosure are all or partially generated. The computer may be a general-purpose computer, a dedicated computer, a computer network, or another programmable apparatus. The computer instruction may be stored in a computer readable storage medium, or may be transmitted by using the computer readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes: any medium that can store program code, such as a read-only memory (ROM), a random access memory (RAM), a magnetic disk, or an optical disc.

What is claimed is:

1. A grant-free resource configuration method, comprising:
    listening to, by a terminal device, a physical downlink control channel on a paging occasion by using a grant-free resource configuration identifier, wherein the grant-free resource configuration identifier comprises at least a grant-free radio network temporary identifier used by a plurality of terminals in a grant-free group; and
    obtaining, by the terminal device on the physical downlink control channel or a physical downlink shared channel indicated by the physical downlink control channel, grant-free resource configuration information sent by a network device.

2. The method according to claim 1, wherein a time unit of the paging occasion comprises at least one of the following: a subframe, a slot, a mini-slot, an orthogonal frequency division multiplexing symbol, a millisecond, and a second.

3. The method according to claim 1, wherein at least one of the physical downlink control channel or the physical downlink shared channel is further configured for sending a paging message on the paging occasion, and wherein the physical downlink control channel is further scrambled by using a paging radio network temporary identifier.

4. The method according to claim 1, wherein the method further comprises:
    configuring, by the network device, the grant-free resource configuration identifier for the terminal device.

5. The method according to claim 1, wherein the grant-free resource configuration identifier further comprises a cell radio network temporary identifier, wherein the cell radio network temporary identifier is used by a specific terminal device.

6. A grant-free resource configuration method, comprising:
    configuring, by a network device, at least one of a physical downlink control channel or a physical downlink shared channel for sending grant-free resource configuration information on a paging occasion to a terminal device; and
    sending, by the network device, the grant-free resource configuration information on the physical downlink control channel or a physical downlink shared channel indicated by the physical downlink control channel, wherein the physical downlink control channel is scrambled by using a grant-free resource configuration identifier, wherein the grant-free resource configuration identifier comprises at least a grant-free radio network temporary identifier used by a plurality of terminals in a grant-free group.

7. The method according to claim 6, wherein a time unit of the paging occasion comprises at least one of the following: a subframe, a slot, a mini-slot, an orthogonal frequency division multiplexing symbol, a millisecond, and a second.

8. The method according to claim 6, wherein at least one of the physical downlink control channel or the physical downlink shared channel is further configured for sending a paging message on the paging occasion, and wherein the physical downlink control channel is further scrambled by using a paging radio network temporary identifier.

9. The method according to claim 6, wherein the method further comprises:
    configuring, by the network device, the grant-free resource configuration identifier for the terminal device.

10. The method according to claim 6, wherein the grant-free resource configuration identifier further comprises a cell radio network temporary identifier, wherein the cell radio network temporary identifier is used by a specific terminal device.

11. A terminal device, comprising:
    a processor, configured to listen to a physical downlink control channel on a paging occasion by using a grant-free resource configuration identifier, wherein the grant-free resource configuration identifier comprises at least a grant-free radio network temporary identifier used by a plurality of terminals in a grant-free group; and
    a receiver, configured to obtain, on the physical downlink control channel or a physical downlink shared channel indicated by the physical downlink control channel, grant-free resource configuration information sent by a network device.

12. The terminal device according to claim 11, wherein at least one of the physical downlink control channel or the physical downlink shared channel is further configured for sending a paging message on the paging occasion, and wherein the physical downlink control channel is further scrambled by using a paging radio network temporary identifier.

13. The terminal device of claim 11, wherein a time unit of the paging occasion comprises at least one of the following: a subframe, a slot, a mini-slot, an orthogonal frequency division multiplexing symbol, a millisecond, and a second.

14. The terminal device of claim 11, wherein the grant-free resource configuration identifier for the terminal device is configured for the terminal device.

15. The terminal device of claim 11, wherein the grant-free resource configuration identifier further comprises a cell radio network temporary identifier, wherein the cell radio network temporary identifier is used by a specific terminal device.

16. A network device, comprising:
- a processor, configured to configure at least one of a physical downlink control channel or a physical downlink shared channel for sending grant-free resource configuration information on a paging occasion to a terminal device; and
- a transmitter, configured to send the grant-free resource configuration information on the physical downlink control channel or a physical downlink shared channel indicated by the physical downlink control channel, wherein the physical downlink control channel is scrambled by using a grant-free resource configuration identifier, wherein the grant-free resource configuration identifier comprises at least a grant-free radio network temporary identifier used by a plurality of terminals in a grant-free group.

17. The network device according to claim 16, wherein at least one of the physical downlink control channel or the physical downlink shared channel is configured for sending a paging message on the paging occasion, and wherein the physical downlink control channel is further scrambled by using a paging identifier.

18. The network device of claim 16, wherein a time unit of the paging occasion comprises at least one of the following: a subframe, a slot, a mini-slot, an orthogonal frequency division multiplexing symbol, a millisecond, and a second.

19. The network device of claim 16, wherein the grant-free resource configuration identifier for the terminal device is configured for the terminal device.

\* \* \* \* \*